(12) United States Patent
Ohkawa et al.

(10) Patent No.: US 11,143,871 B2
(45) Date of Patent: Oct. 12, 2021

(54) IMAGE DISPLAY APPARATUS

(71) Applicant: SONY CORPORATION, Tokyo (JP)

(72) Inventors: Shingo Ohkawa, Kanagawa (JP); Ryo Ogawa, Kanagawa (JP); Mariko Nishiyama, Kanagawa (JP); Atsushi Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 153 days.

(21) Appl. No.: 16/500,998

(22) PCT Filed: Feb. 26, 2018

(86) PCT No.: PCT/JP2018/006943
§ 371 (c)(1),
(2) Date: Oct. 4, 2019

(87) PCT Pub. No.: WO2018/190007
PCT Pub. Date: Oct. 18, 2018

(65) Prior Publication Data
US 2020/0033603 A1  Jan. 30, 2020

(30) Foreign Application Priority Data

Apr. 13, 2017  (JP) .............................. JP2017-079777

(51) Int. Cl.
*G02B 27/01* (2006.01)
*G02B 7/198* (2021.01)
*G02B 19/00* (2006.01)

(52) U.S. Cl.
CPC ......... *G02B 27/0172* (2013.01); *G02B 7/198* (2013.01); *G02B 19/0028* (2013.01); *G02B 19/0047* (2013.01); *G02B 2027/0123* (2013.01)

(58) Field of Classification Search
CPC .......................... G02B 27/0172; G02B 7/198; G02B 19/0028; G02B 19/0047; G02B 2027/0123

(Continued)

(56) References Cited

U.S. PATENT DOCUMENTS 8,139,103 B2    3/2012  McGrew
2004/0062502 A1  4/2004  Levola
(Continued)

FOREIGN PATENT DOCUMENTS

CN    1503026 A    6/2004
CN    1685291 A    10/2005
(Continued)

OTHER PUBLICATIONS

International Search Report and Written Opinion of PCT Application No. PCT/JP2018/006943, dated May 1, 2018, 10 pages of ISRWO.

(Continued)

*Primary Examiner* — Collin X Beatty
(74) *Attorney, Agent, or Firm* — Chip Law Group

(57) ABSTRACT

An image display apparatus that includes a first light collecting-reflecting device (10, 11) which image light (L0) from an image forming apparatus enters, and a second light collecting-reflecting device (20, 21) which second light (L2), of the image light, having passed through the first light collecting-reflecting device enters. The first light collecting-reflecting device has transmission action and light collecting-reflecting action with respect to the image light. The first light collecting-reflecting device collects and reflects first light (L1), of the entering image light, toward a first conversion position in a viewer's eye (201). The second light collecting-reflecting device has at least the light collecting-reflecting action with respect to the image light. The second light collecting-reflecting device causes the second light to reenter the first light collecting-reflecting device and collects and reflects the second light toward a second conversion position. The second conversion position is different from the first conversion position in a plane orthogonal to an optical axis of the viewer's eye.

13 Claims, 21 Drawing Sheets

(58) Field of Classification Search
USPC .................................................. 359/566
See application file for complete search history.

(56) References Cited

U.S. PATENT DOCUMENTS

| | | | |
|---|---|---|---|
| 2008/0117341 | A1 | 5/2008 | McGrew |
| 2010/0060551 | A1 | 3/2010 | Sugiyama et al. |
| 2014/0140653 | A1 | 5/2014 | Brown et al. |
| 2015/0160529 | A1* | 6/2015 | Popovich ............ G02F 1/13342 |
| | | | 359/200.8 |
| 2016/0033771 | A1 | 2/2016 | Tremblay et al. |
| 2018/0284440 | A1* | 10/2018 | Popovich ........... G02B 27/0172 |

FOREIGN PATENT DOCUMENTS

| | | |
|---|---|---|
| CN | 101589327 A | 11/2009 |
| CN | 103823267 A | 5/2014 |
| CN | 106170729 A | 11/2016 |
| EP | 2733517 A1 | 5/2014 |
| JP | 05-346508 A | 12/1993 |
| JP | 2006-501499 A | 1/2006 |
| JP | 2006-053384 A | 2/2006 |
| JP | 2009-186794 A | 8/2009 |
| JP | 2010-271565 A | 12/2010 |
| JP | 2014-048498 A | 3/2014 |
| JP | 2014-059395 A | 4/2014 |
| JP | 2014-132328 A | 7/2014 |
| JP | 2016-085428 A | 5/2016 |
| JP | 2016-517036 A | 6/2016 |
| KR | 10-2015-0136601 A | 12/2015 |
| WO | 2004/030160 A2 | 4/2004 |
| WO | 2009/041055 A1 | 4/2009 |
| WO | 2014/155288 A2 | 10/2014 |

OTHER PUBLICATIONS

Office Action for CN Patent Application No. 201880023341.7, dated Apr. 2, 2021, 03 pages of English Translation and 05 pages of Office Action.

* cited by examiner

[FIG. 1]
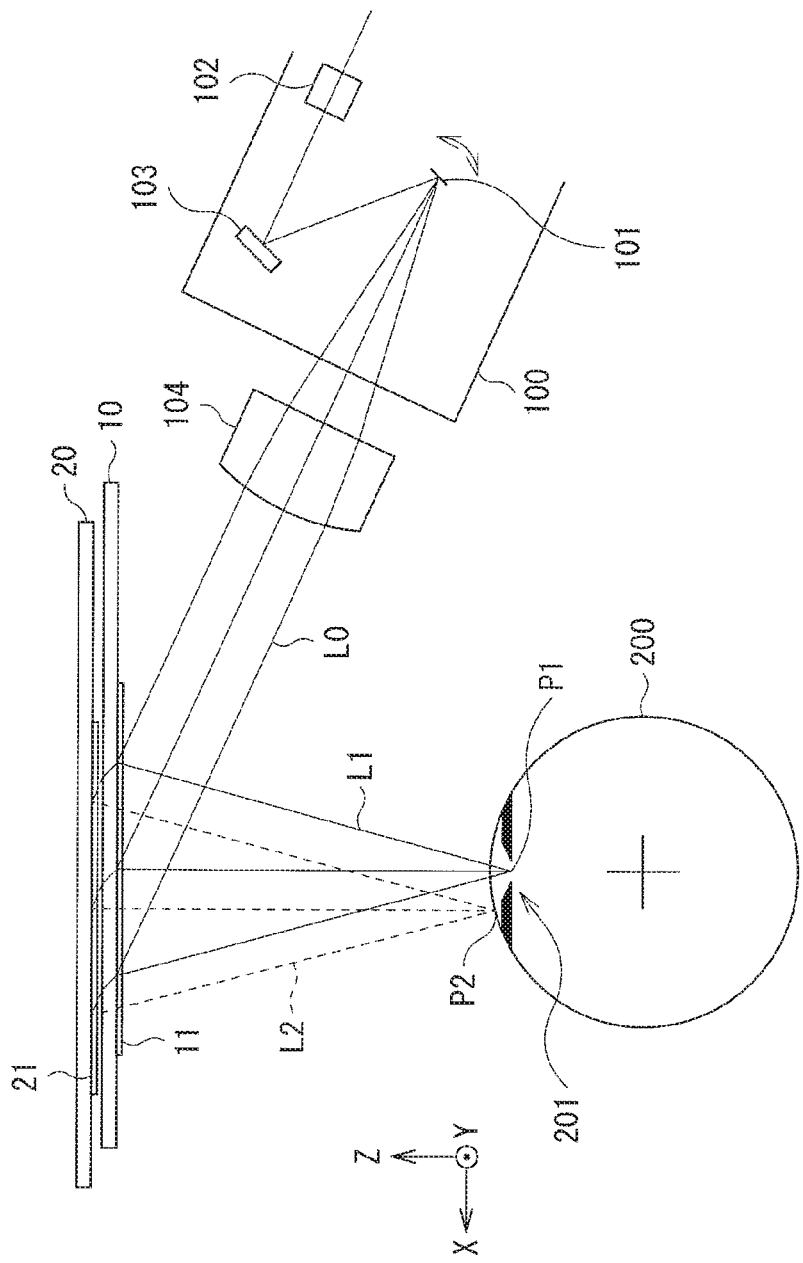

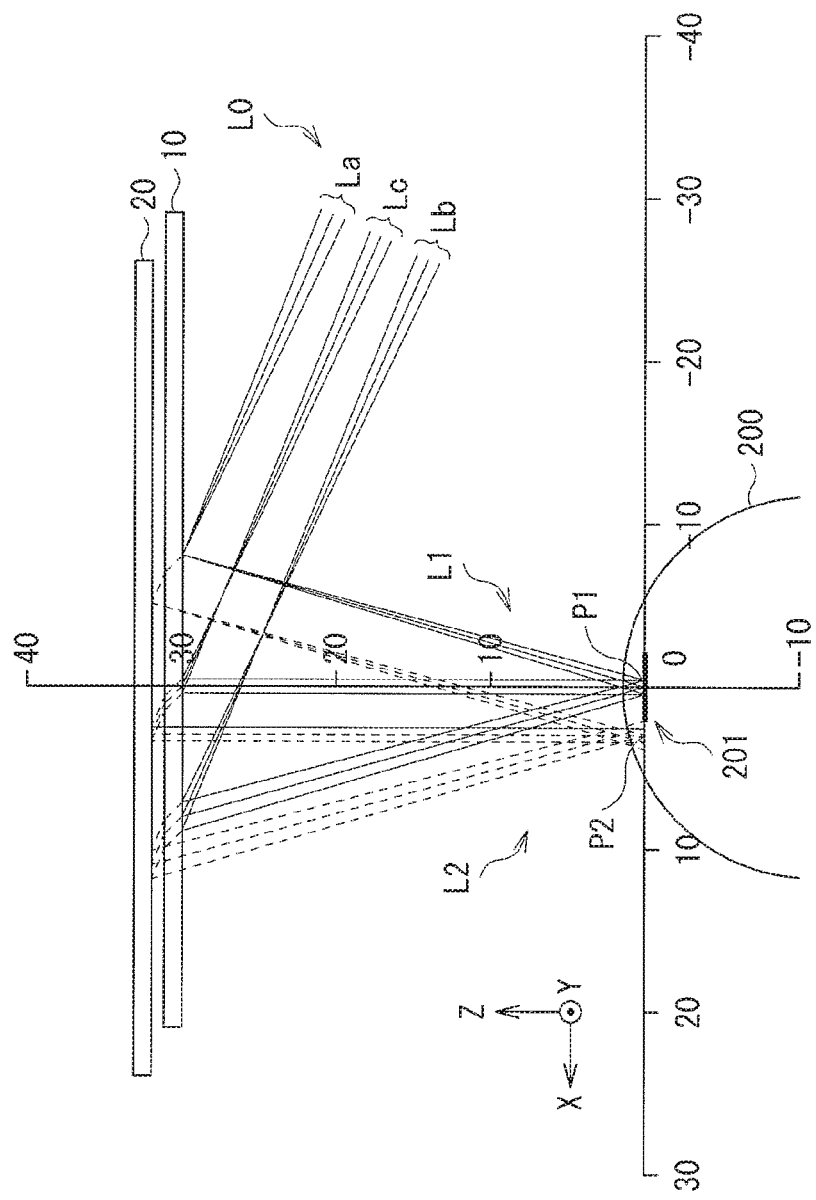
[FIG. 2]

[FIG. 3]
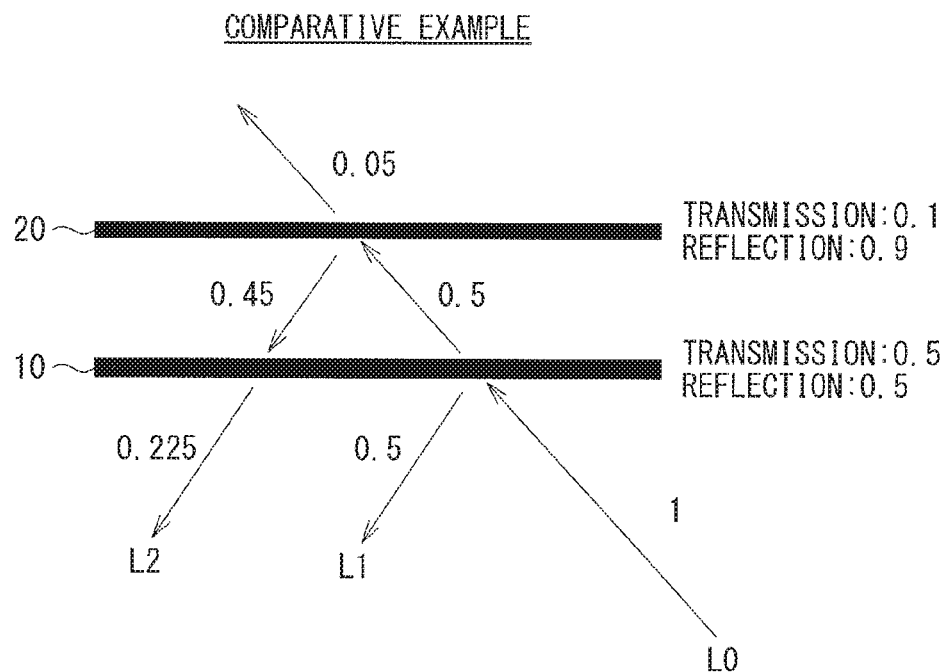
[FIG. 4]
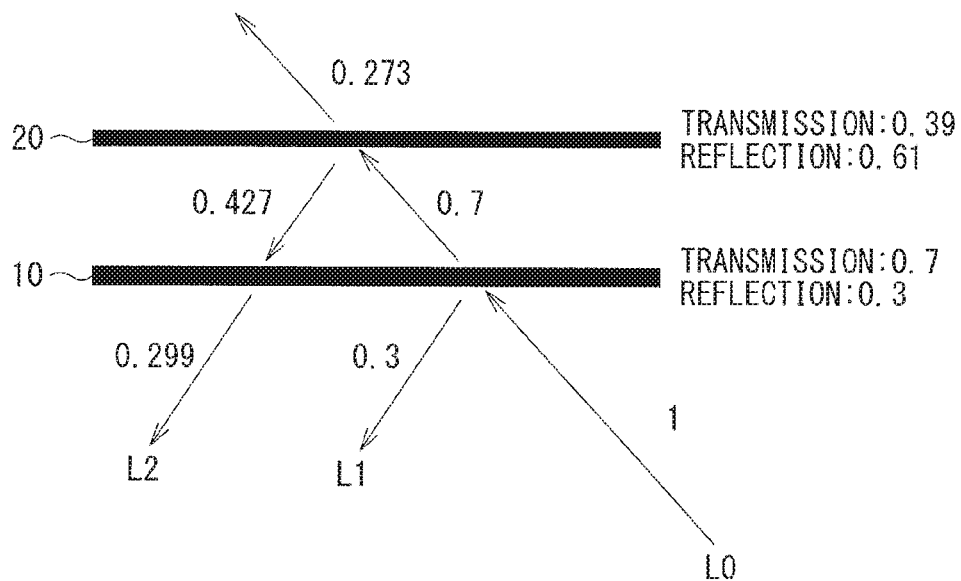

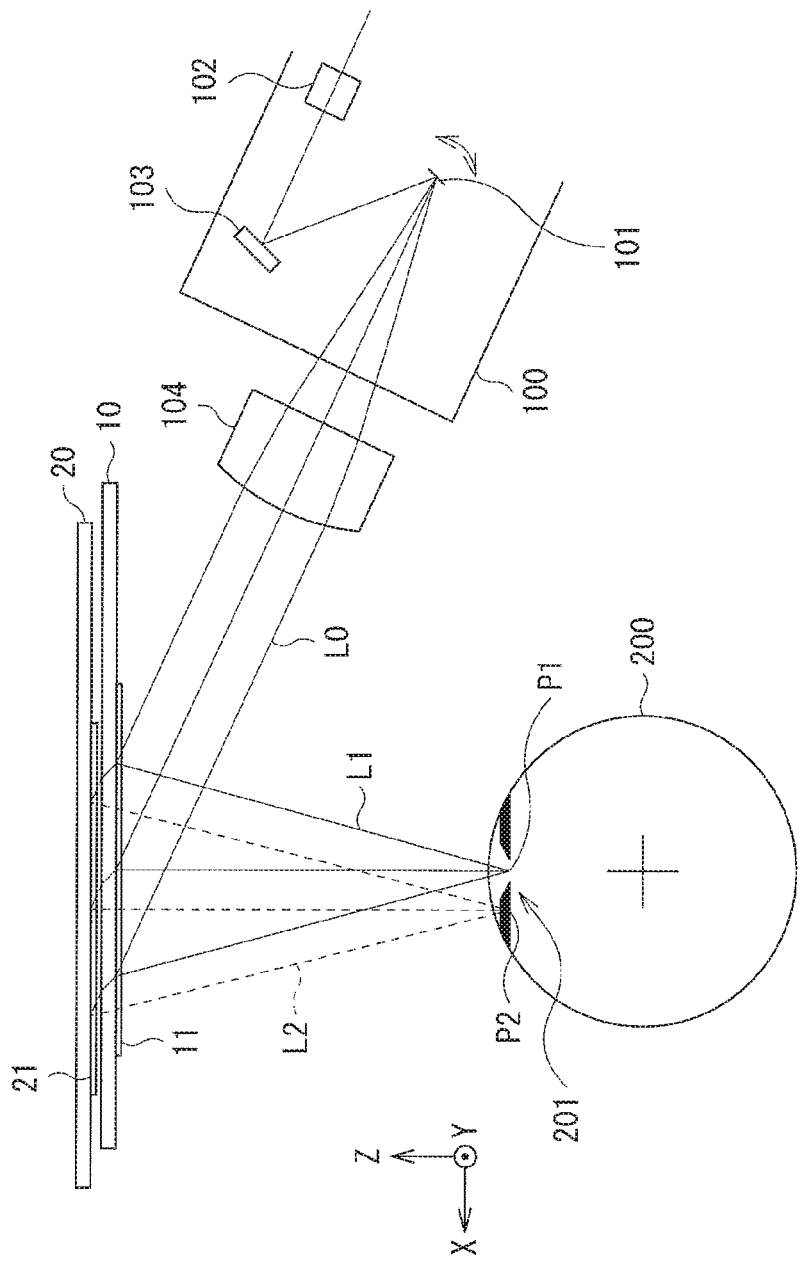
[FIG. 5]

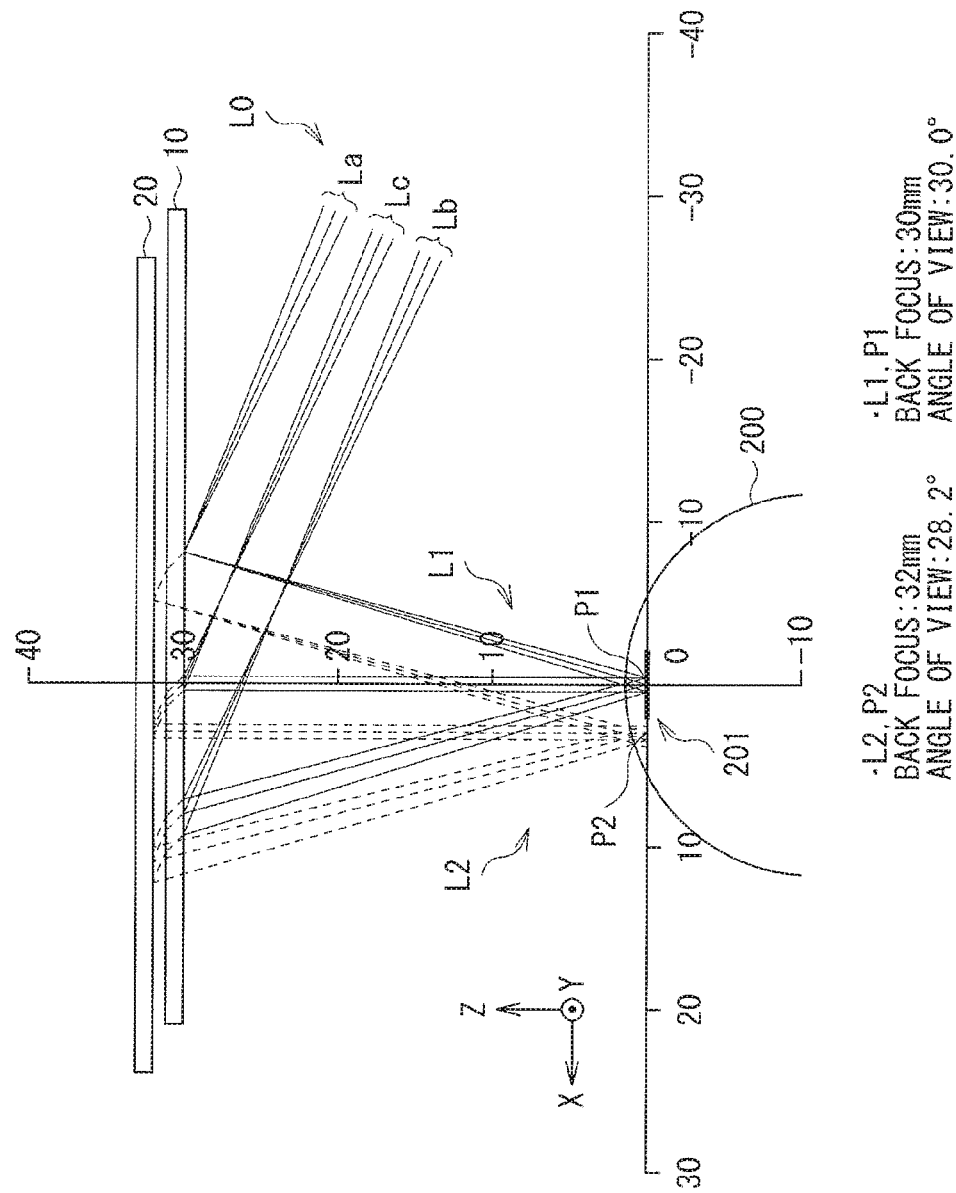
[FIG. 6]

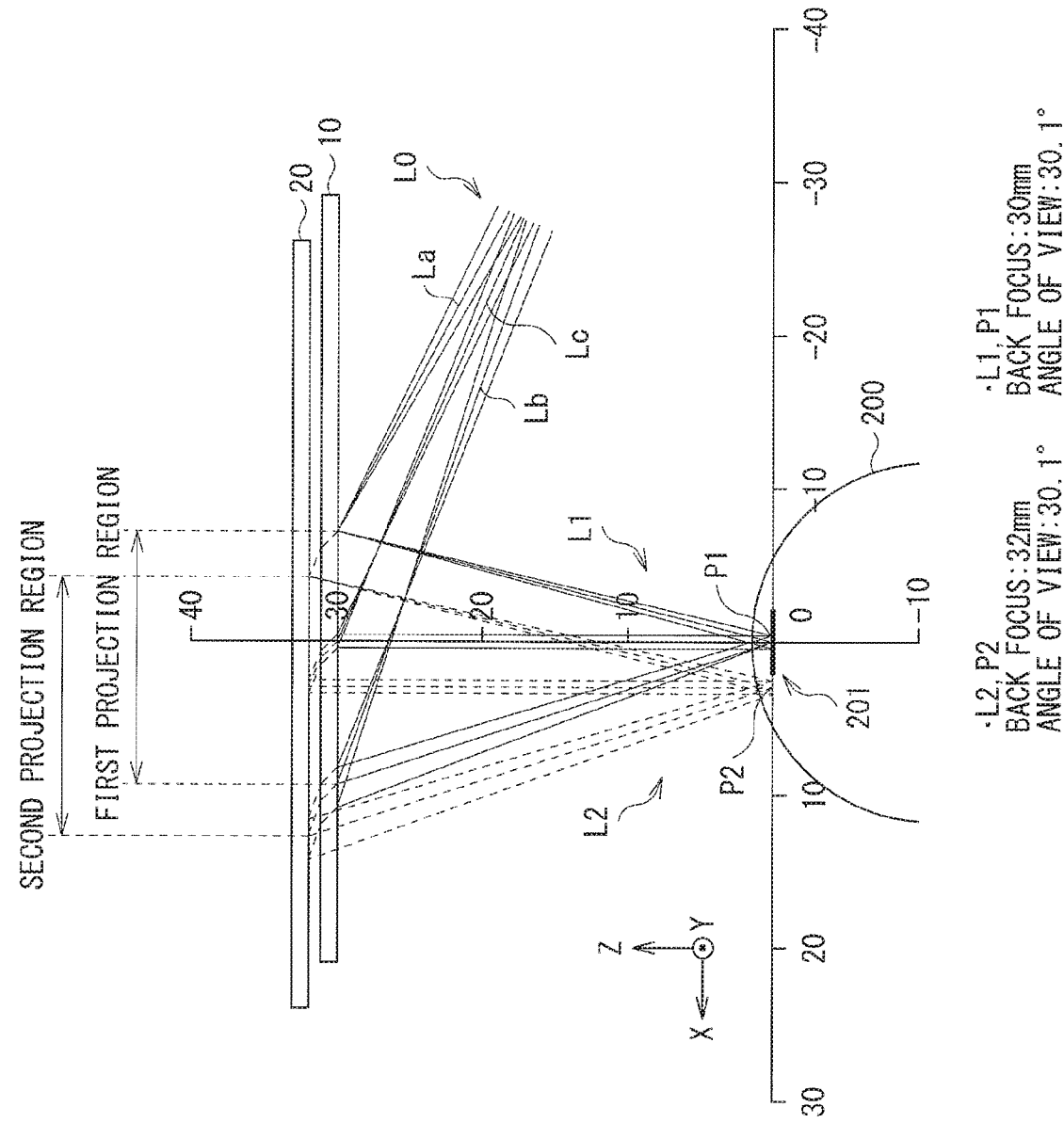
[FIG. 7]

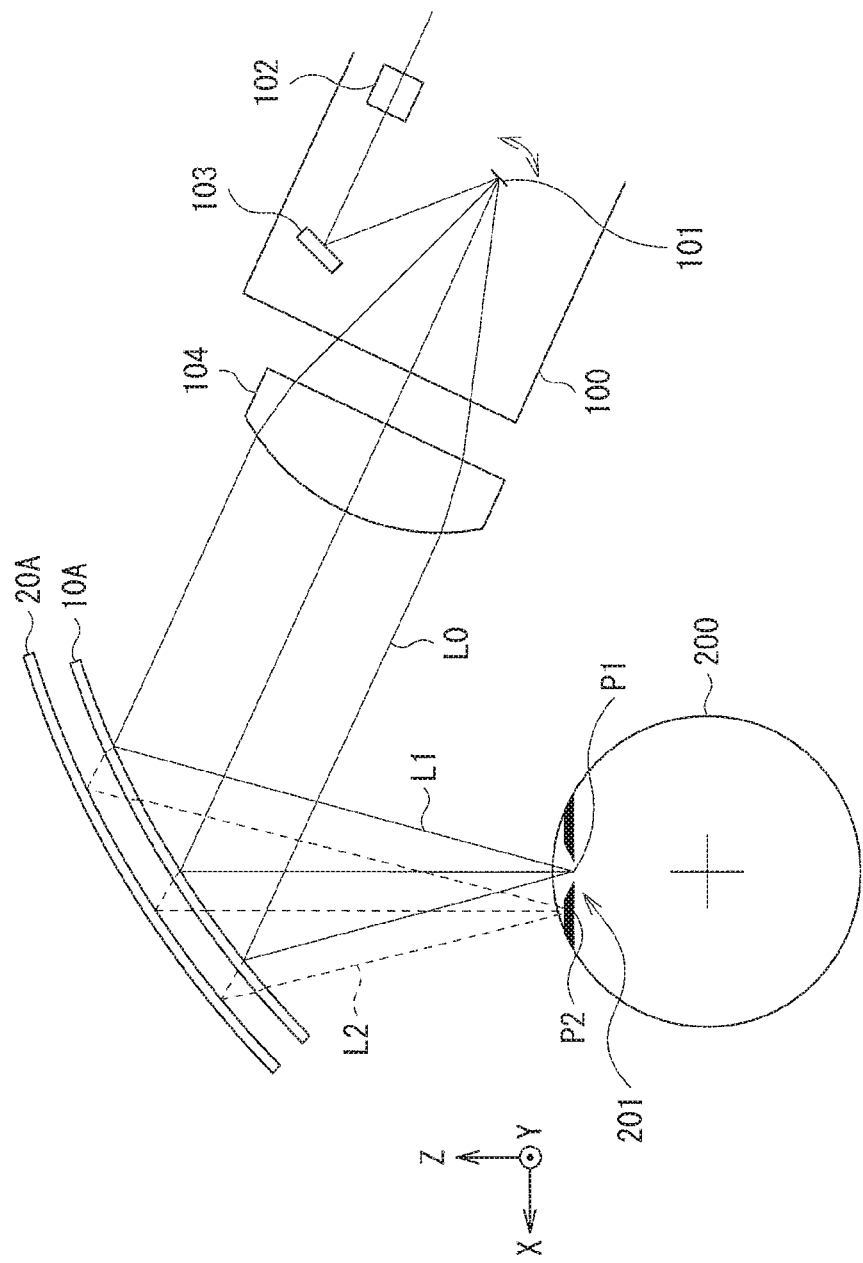
[FIG. 8]

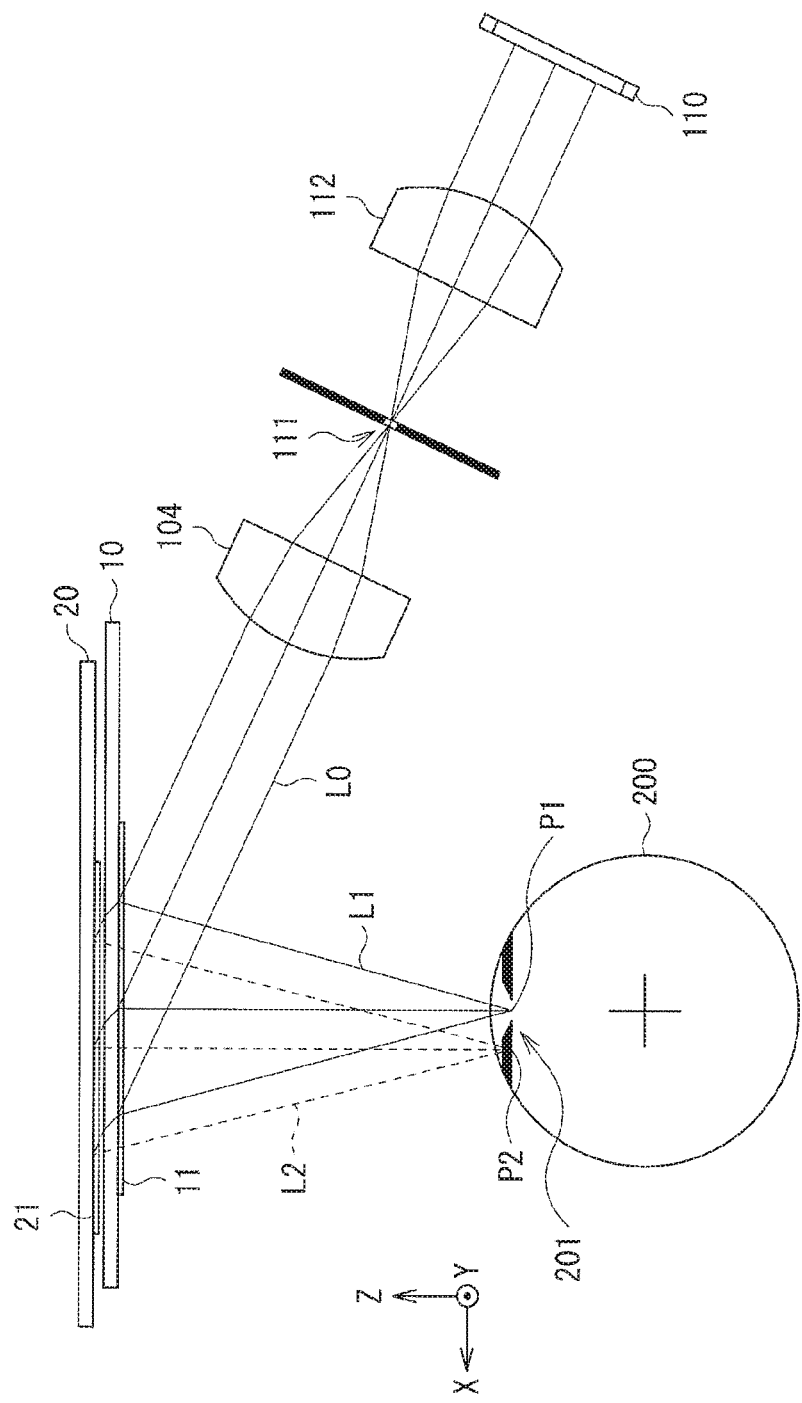
[FIG. 9]

[FIG. 10]
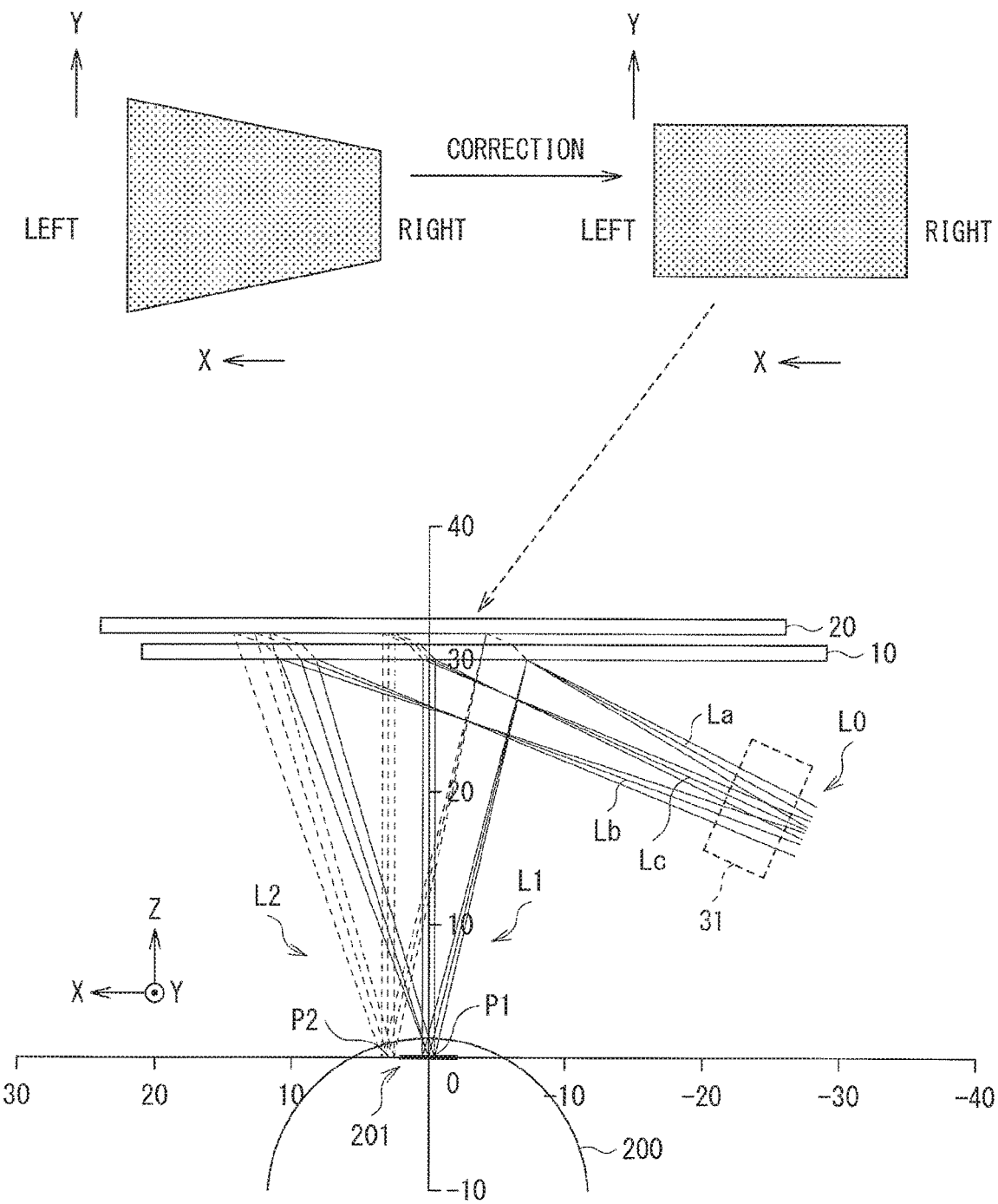

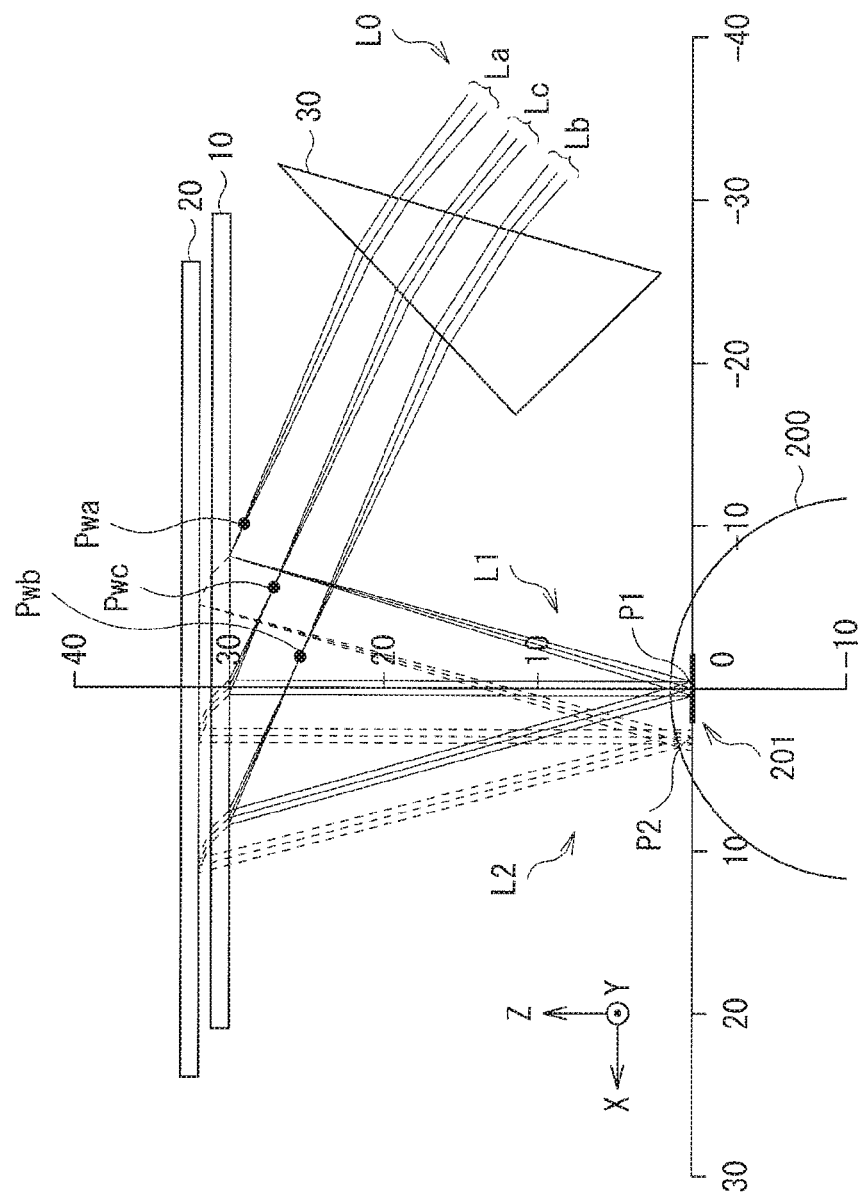
[FIG. 11]

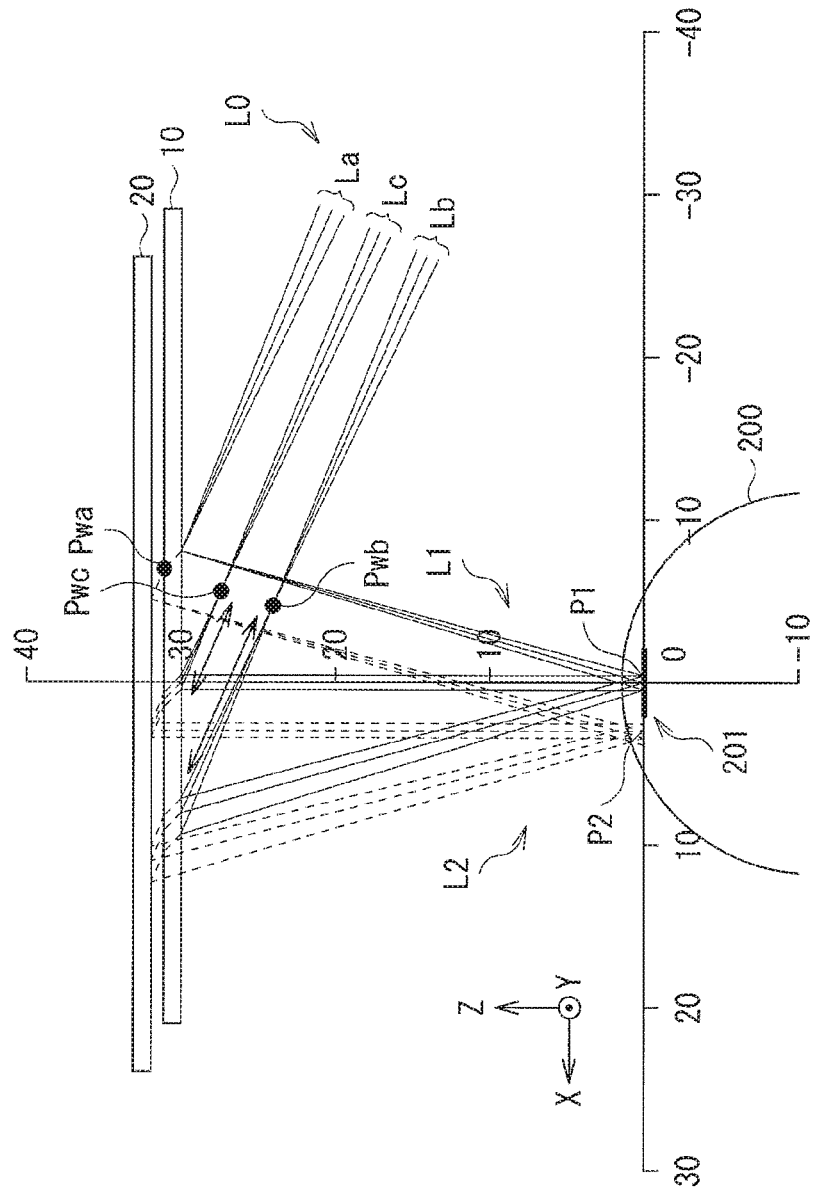
[FIG. 12]
COMPARATIVE EXAMPLE

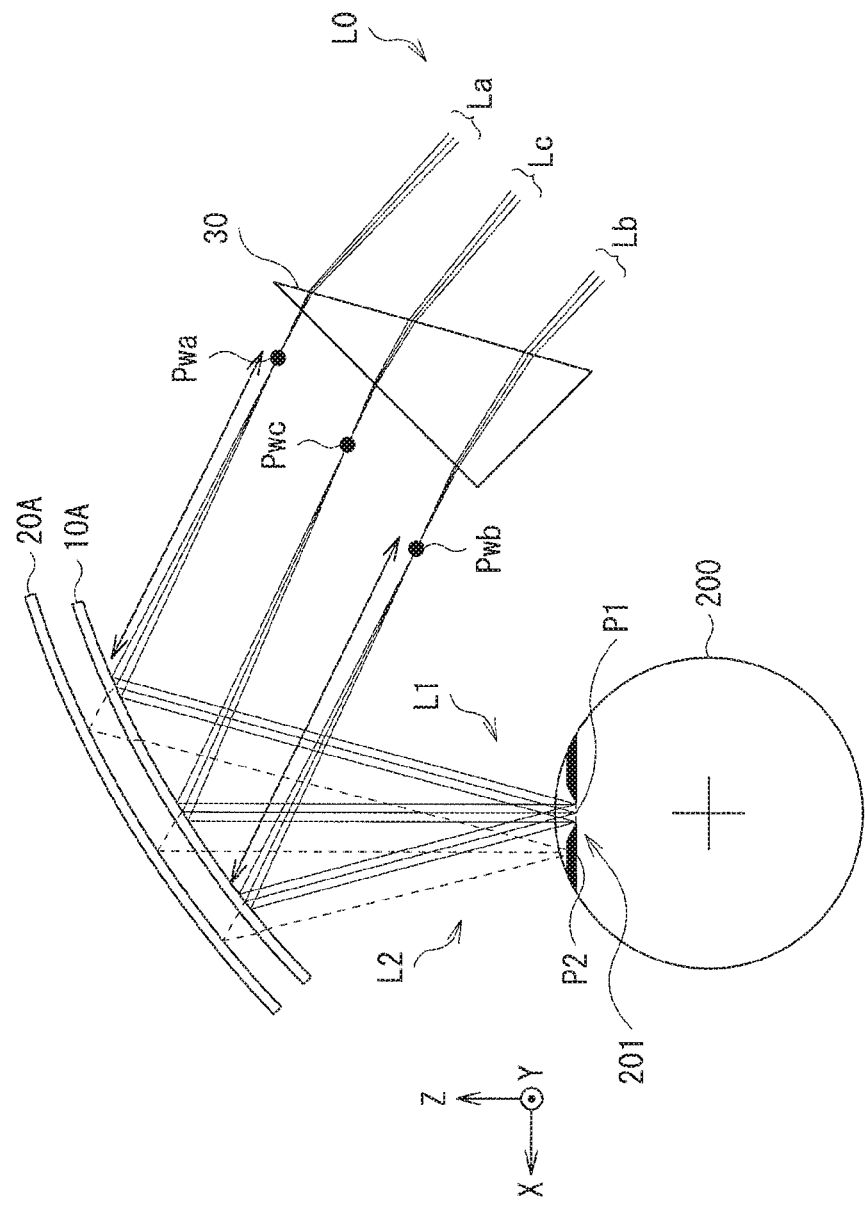
[FIG. 13]

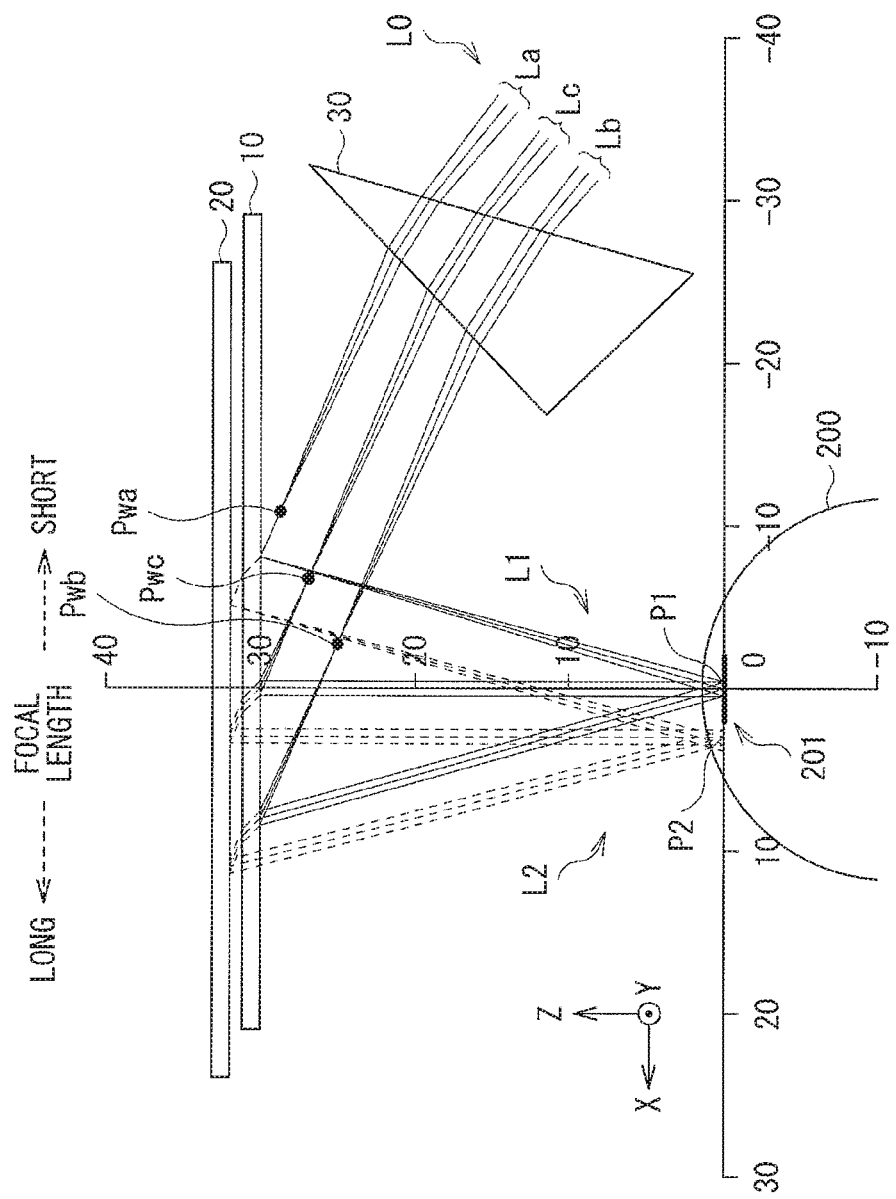

[ FIG. 15 ]
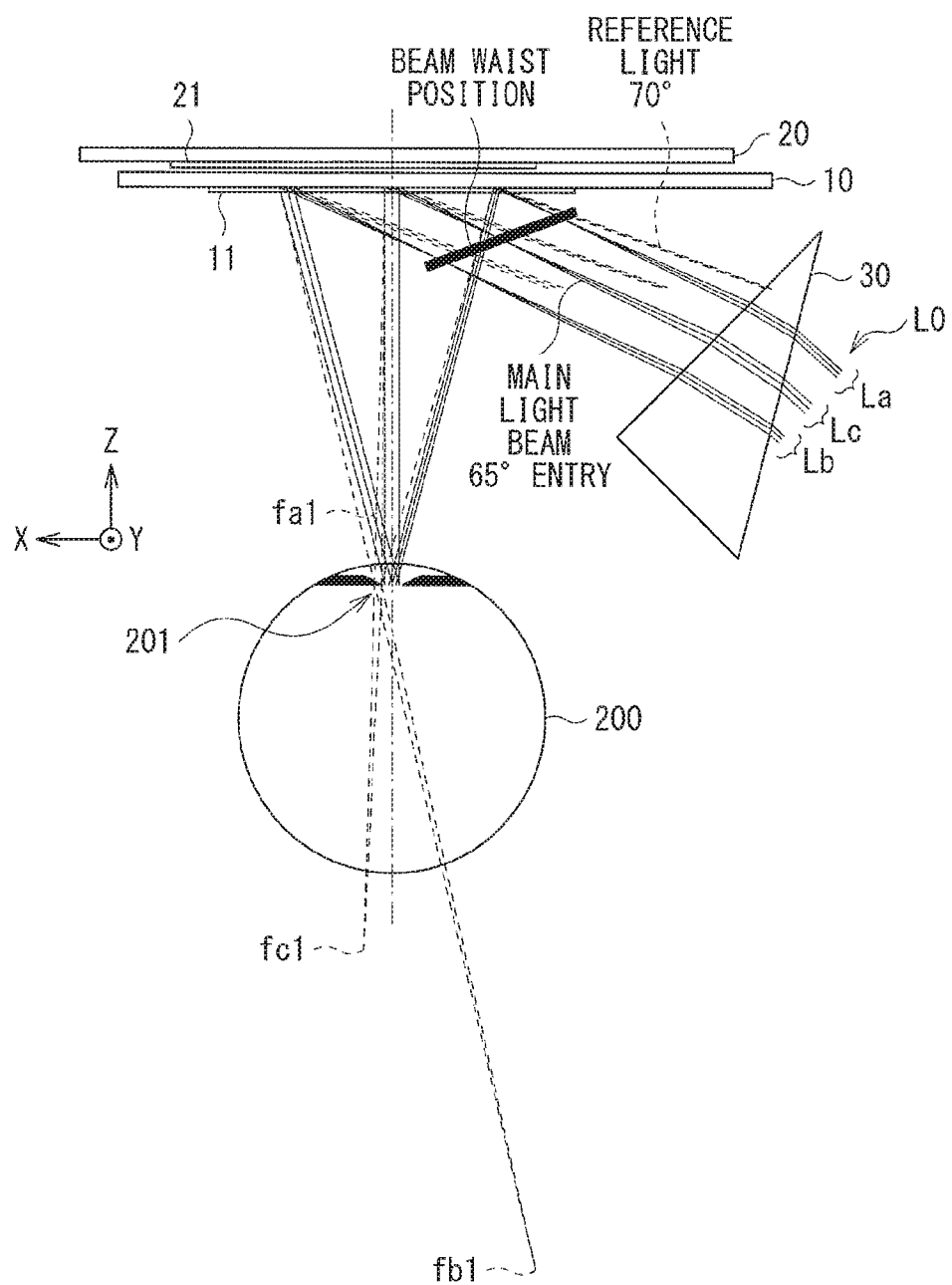

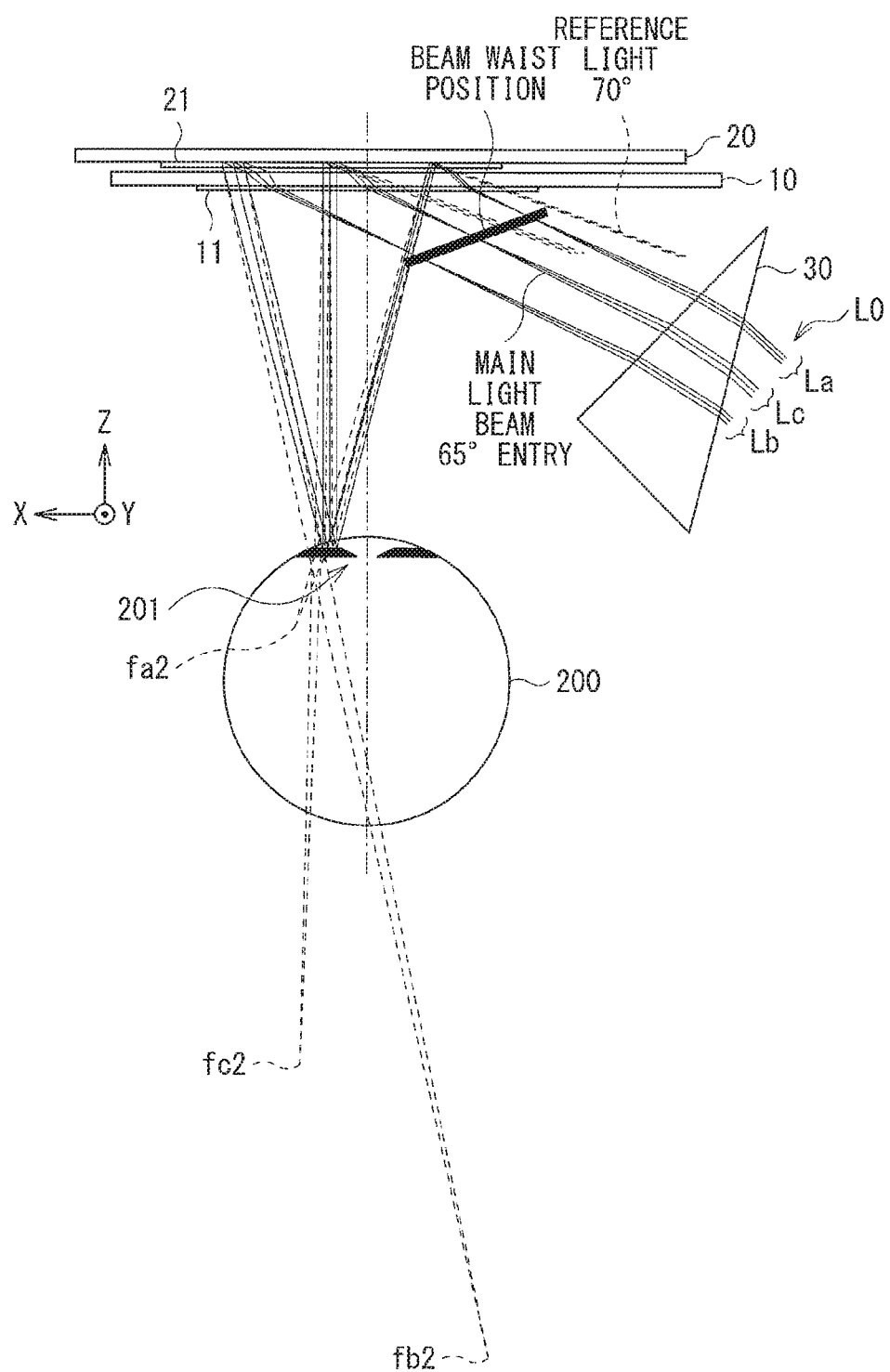
[FIG. 16]

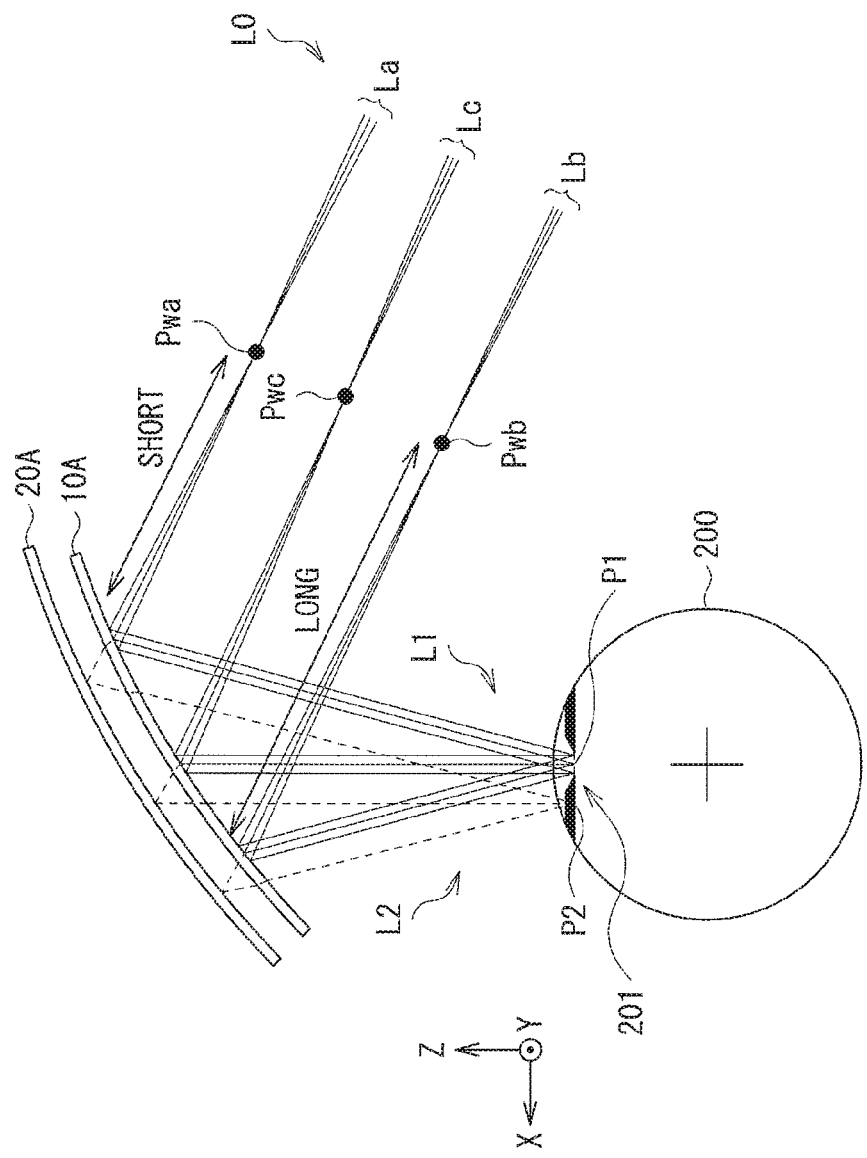

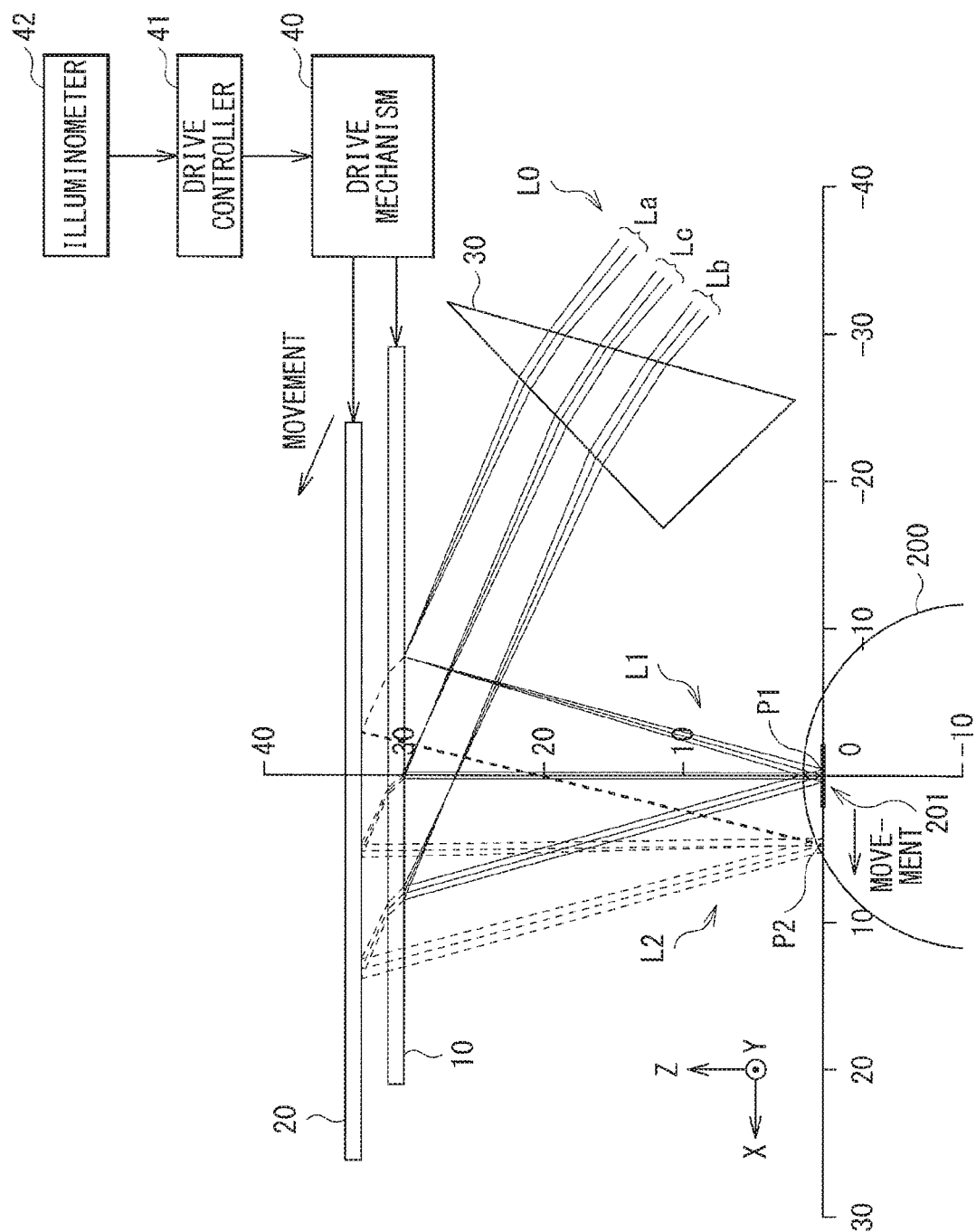
[FIG. 18]

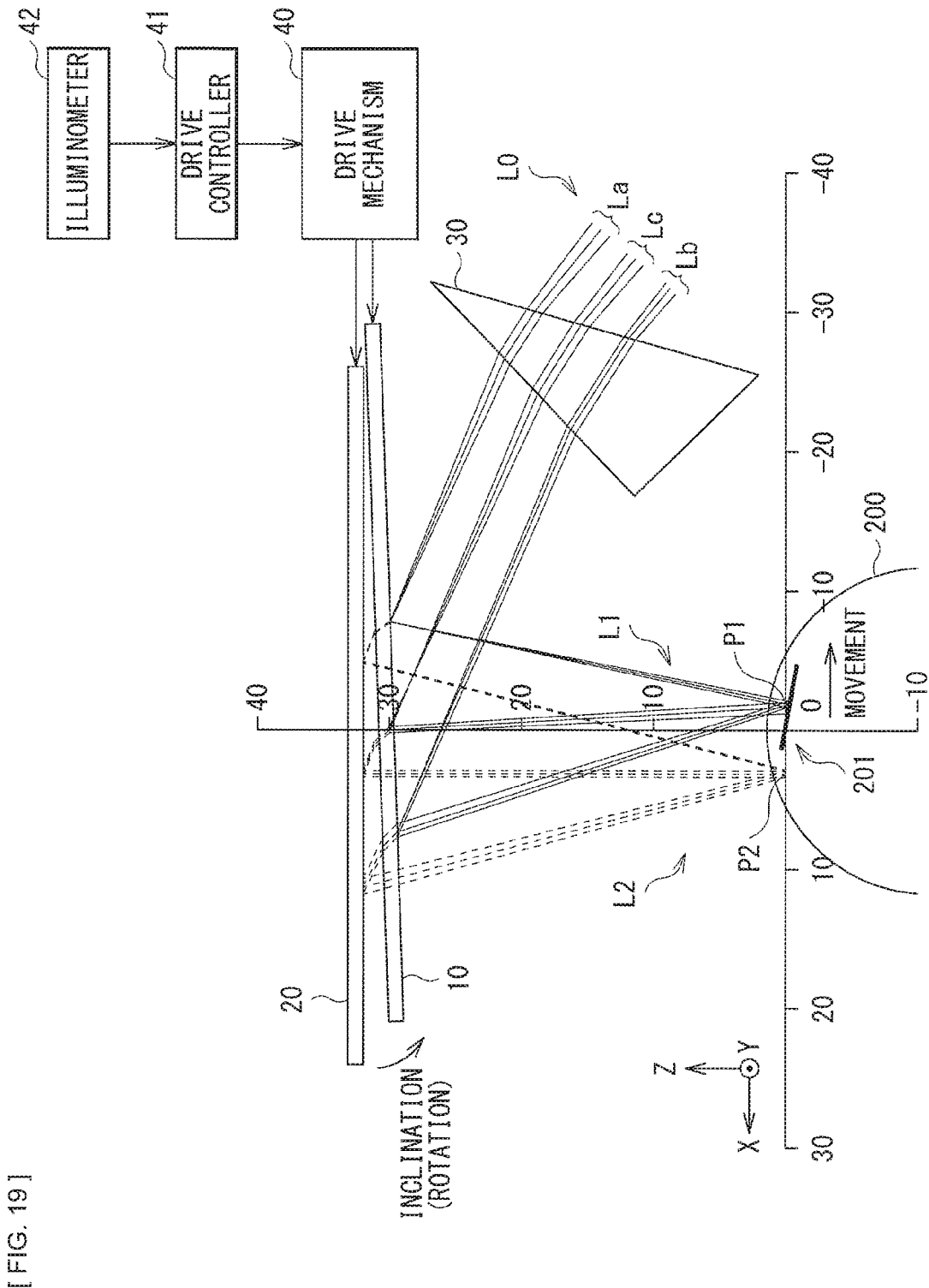
[FIG. 19]

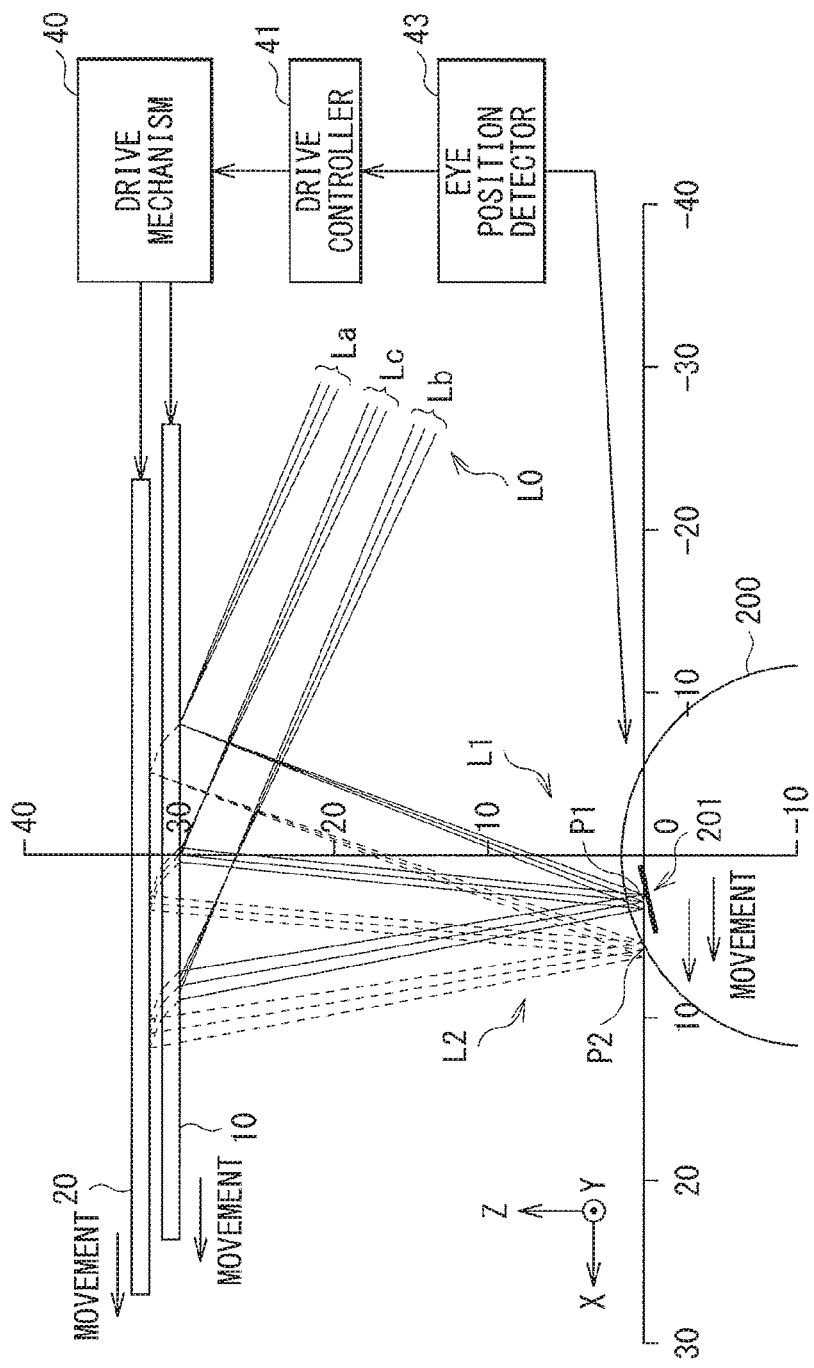
[FIG. 20]

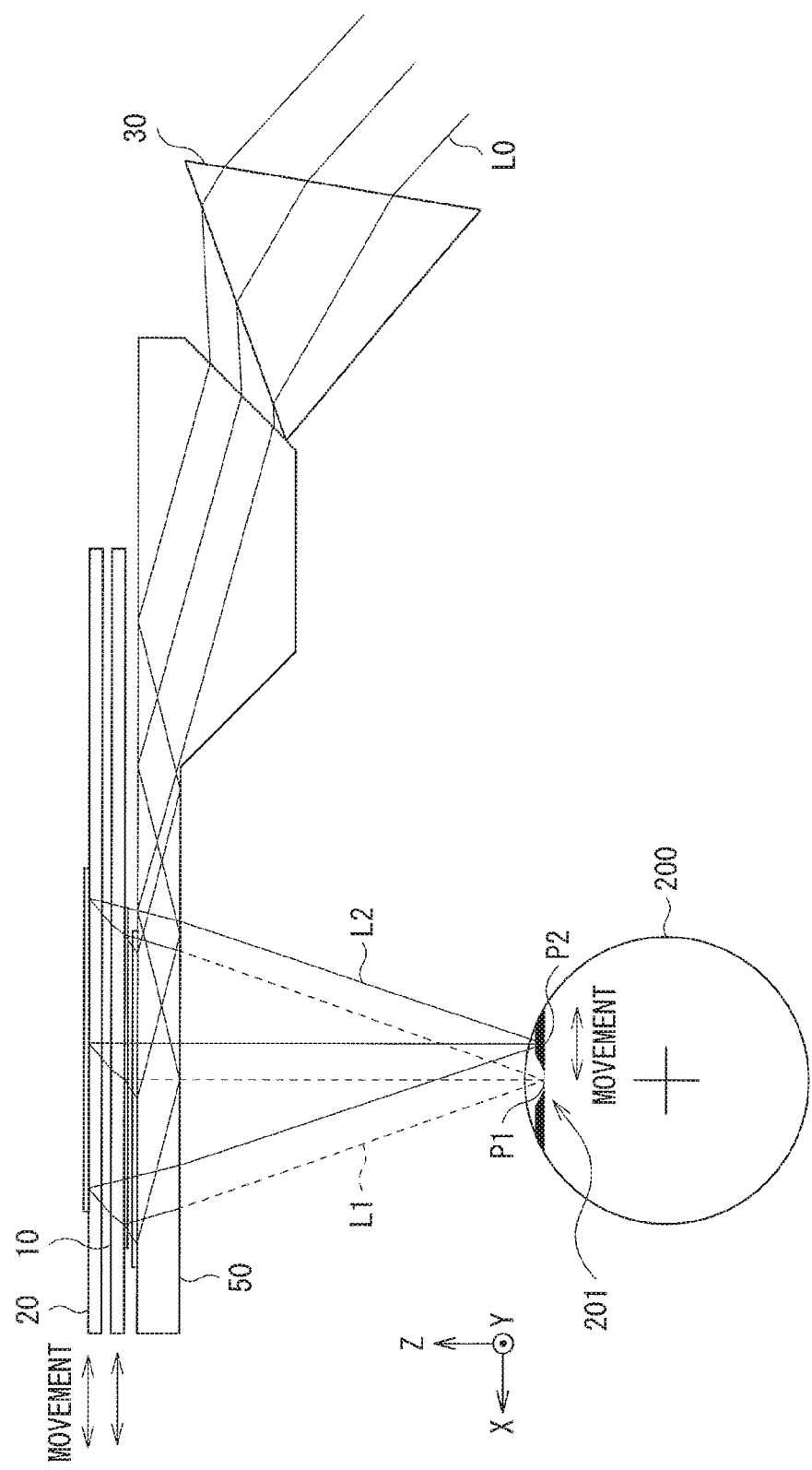
[FIG. 21]

[ FIG. 22 ]
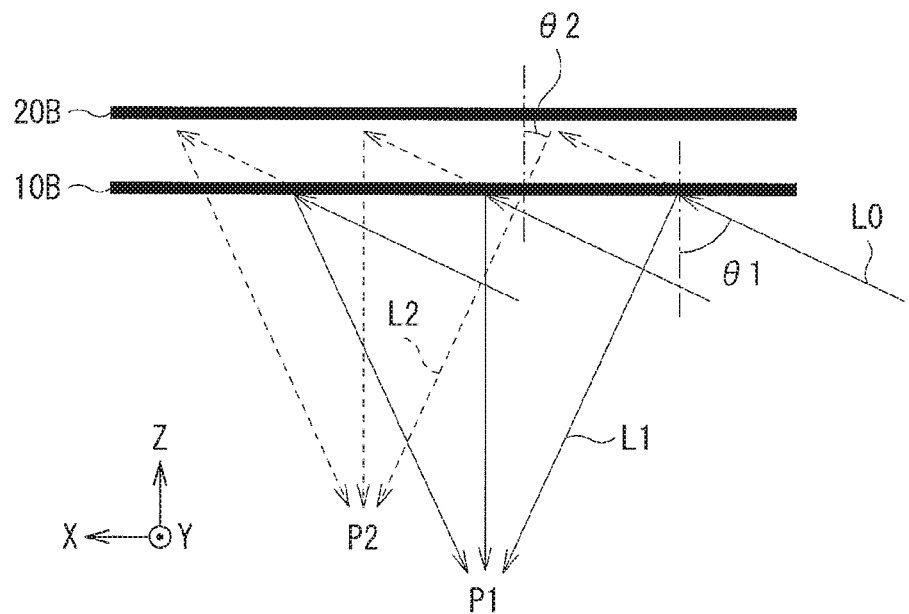
[ FIG. 23 ]
COMPARATIVE EXAMPLE
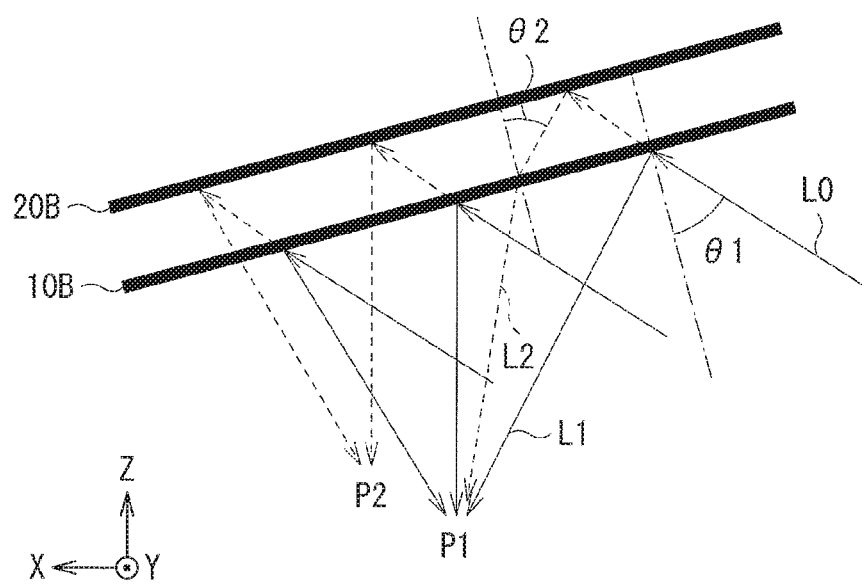

IMAGE DISPLAY APPARATUS

CROSS REFERENCE TO RELATED APPLICATIONS

This application is a U.S. National Phase of International Patent Application No. PCT/JP2018/006943 filed on Feb. 26, 2018, which claims priority benefit of Japanese Patent Application No. JP 2017-079777 filed in the Japan Patent Office on Apr. 13, 2017. Each of the above-referenced applications is hereby incorporated herein by reference in its entirety.

TECHNICAL FIELD

The present disclosure relates to an image display apparatus that guides image light from an image forming apparatus to a viewer's eye.

BACKGROUND ART

An image display apparatus is under development that guides image light from an image forming apparatus to a viewer's eye. Such an image display apparatus is utilized as a head-mounted display, for example.

CITATION LIST

Patent Literature

PTL 1: Japanese Unexamined Patent Application Publication No. 2006-53384
PTL 2: Japanese Unexamined Patent Application Publication No. 2016-85428
PTL 3: Japanese Unexamined Patent Application Publication No. H 5-346508
PTL 4: Japanese Unexamined Patent Application Publication No. 2014-59395

SUMMARY OF THE INVENTION

Such an image display apparatus preferably has a wide viewable range of image light and is also required to provide a natural view for a viewer.

It is desirable to provide an image display apparatus that makes it possible to expand a viewable range of image light.

An image display apparatus according to an embodiment of the present disclosure includes a first light collecting-reflecting device which image light from an image forming apparatus enters and a second light collecting-reflecting device which second light, of the image light, having passed through the first light collecting-reflecting device enters. The first light collecting-reflecting device has transmission action and light collecting-reflecting action with respect to the image light. The first light collecting-reflecting device collects and reflects first light, of the entering image light, toward a first conversion position in a viewer's eye. The second light collecting-reflecting device has at least the light collecting-reflecting action with respect to the image light. The second light collecting-reflecting device causes the second light to reenter the first light collecting-reflecting device and collect and reflect the second light toward a second conversion position. The second conversion position is different from the first conversion position in a plane orthogonal to an optical axis of the viewer's eye.

In the image display apparatus according to an embodiment of the present disclosure, the first light of the image light is collected and reflected toward the first conversion position by the first light collecting-reflecting device, and the second light of the image light is collected and reflected toward the second conversion position different from the first conversion position by the second light collecting-reflecting device.

According to the image display apparatus according to the embodiment of the present disclosure, the first light of the image light is collected and reflected toward the first conversion position by the first light collecting-reflecting device, and the second light of the image light is collected and reflected toward the second conversion position different from the first conversion position by the second light collecting-reflecting device. Therefore, expansion of the viewable range of the image light is possible.

It is to be noted that the effects described here are not necessarily limiting, and any of effects described in the present disclosure may be provided.

BRIEF DESCRIPTION OF DRAWINGS

FIG. 1 is a configuration diagram schematically illustrating a basic configuration example of an image display apparatus according to a first embodiment of the present disclosure.

FIG. 2 is a configuration diagram schematically illustrating the basic configuration example of the image display apparatus according to the first embodiment.

FIG. 3 is a configuration diagram schematically illustrating an example of an image display apparatus of a comparative example to the first embodiment.

FIG. 4 is a configuration diagram schematically illustrating an example of a first preferred configuration example of the image display apparatus according to the first embodiment.

FIG. 5 is a configuration diagram schematically illustrating an example of a second preferred configuration example of the image display apparatus according to the first embodiment.

FIG. 6 is a configuration diagram schematically illustrating an example of the second preferred configuration example of the image display apparatus according to the first embodiment.

FIG. 7 is a configuration diagram schematically illustrating an example of a third preferred configuration example of the image display apparatus according to the first embodiment.

FIG. 8 is a configuration diagram schematically illustrating a first modification example of the image display apparatus according to the first embodiment.

FIG. 9 is a configuration diagram schematically illustrating a second modification example of the image display apparatus according to the first embodiment.

FIG. 10 is a configuration diagram schematically illustrating a third modification example of the image display apparatus according to the first embodiment.

FIG. 11 is a configuration diagram schematically illustrating an example of an image display apparatus according to a second embodiment.

FIG. 12 is a configuration diagram schematically illustrating an example of an image display apparatus of a comparative example to the second embodiment.

FIG. 13 is a configuration diagram schematically illustrating a modification example of the image display apparatus according to the second embodiment.

FIG. 14 is a configuration diagram schematically illustrating an example of an image display apparatus according to a third embodiment.

FIG. 15 is a configuration diagram schematically illustrating an example of a focal position provided by a first light collecting-reflecting device in the image display apparatus according to the third embodiment.

FIG. 16 is a configuration diagram schematically illustrating an example of a focal position provided by a second light collecting-reflecting device in the image display apparatus according to the third embodiment.

FIG. 17 is a configuration diagram schematically illustrating a modification example of the image display apparatus according to the third embodiment.

FIG. 18 is a configuration diagram schematically illustrating a first configuration example of an image display apparatus according to a fourth embodiment.

FIG. 19 is a configuration diagram schematically illustrating a second configuration example of the image display apparatus according to the fourth embodiment.

FIG. 20 is a configuration diagram schematically illustrating an example of an image display apparatus according to a fifth embodiment.

FIG. 21 is a configuration diagram schematically illustrating a modification example of the image display apparatus according to the fifth embodiment.

FIG. 22 is a configuration diagram schematically illustrating an example of an image display apparatus according to a sixth embodiment.

FIG. 23 is a configuration diagram schematically illustrating an example of an image display apparatus of a comparative example to the sixth embodiment.

MODES FOR CARRYING OUT THE INVENTION

In the following, some embodiments of the present disclosure are described in detail with reference to the drawings. It is to be noted that description is given in the following order.
1. First Embodiment
   1.1 Basic Configuration (FIG. 1 and FIG. 2)
   1.2 Preferred Configuration Example (FIG. 3 to FIG. 7)
   1.3 Effects
   1.4 Modification Examples of First Embodiment (FIG. 8 to FIG. 10)
2. Second Embodiment
   2.1 Configuration (FIG. 11 and FIG. 12)
   2.2 Modification Example of Second Embodiment (FIG. 13)
3. Third Embodiment
   3.1 Configuration (FIG. 14 to FIG. 16)
   3.2 Modification Example of Third Embodiment (FIG. 17)
4. Fourth Embodiment (FIG. 18 and FIG. 19)
5. Fifth Embodiment (FIG. 20 and FIG. 21)
6. Sixth Embodiment (FIG. 22 and FIG. 23)
7. Other Embodiments 1. First Embodiment 1.1 Basic Configuration FIG. 1 and FIG. 2 schematically illustrate a basic configuration example of an image display apparatus according to a first embodiment of the present disclosure.

The image display apparatus according to the first embodiment of the present disclosure is an apparatus that guides image light L0 from an image forming apparatus 100 to a viewer's eye and is usable as a head-mounted display, for example. FIG. 1 illustrates only main light beams of the image light L0 that enter the image display apparatus from the image forming apparatus 100. FIG. 2 illustrates the image light L0 so that variation in a beam diameter of light from a plurality of different pixels of the image forming apparatus 100 is seen. FIG. 2 illustrates, as the image light L0, a luminous flux La from a right pixel, a luminous flux Lb from a left pixel, and a luminous flux Lc from a middle pixel.

The image forming apparatus 100 may be a laser scanning display apparatus, for example. The image forming apparatus 100 includes a scanning mirror 101, a correcting lens 102, and a reflecting mirror 103.

In the image forming apparatus 100, laser light from an unillustrated laser light source enters the scanning mirror 101 via the correcting lens 102 and the reflecting mirror 103. The correcting lens 102 adjusts a beam waist of the laser light from the unillustrated laser light source. The unillustrated laser light source outputs the laser light intensity of which is modulated on the basis of image data. A scanning direction and scanning timing of the scanning mirror 101 are controlled on the basis of the image data. The scanning mirror 101 generates two-dimensional image light L0 by two-dimensionally scanning the laser light from the unillustrated laser light source on the basis of the image data.

A collimator lens 104 collimates a traveling direction of a beam of each pixel from the image forming apparatus 100 and causes the beam to enter the image display apparatus as the image light L0.

The image display apparatus includes a first light collecting-reflecting device and a second light collecting-reflecting device in order from side that the image light L0 enters from the image forming apparatus 100.

Here, in FIG. 1 and FIG. 2, two axes orthogonal to a Z-axis are an X-axis and a Y-axis. The X-axis and the Y-axis are axes orthogonal to each other. An optical axis direction of the eye of the viewer's eyeball 200 is a Z-axis direction. A plane orthogonal to the optical axis direction of the eye (orthogonal plane to the optical axis direction of the eye) is an XY plane. In FIG. 1 and FIG. 2, a symbol 201 refers to a pupil in the viewer's eyeball 200.

The first light collecting-reflecting device receives the image light L0 from the image forming apparatus 100, and has transmission action and light collecting-reflecting action with respect to the image light L0. The first light collecting-reflecting device collects and reflects a first light beam L1 of the entering image light L0 to a first conversion position P1 in the viewer's eye.

Specifically, the first light collecting-reflecting device may be configured to have, for example, a first substrate 10 and a first semi-transmitting reflecting layer 11 formed on a surface of the first substrate 10. The first semi-transmitting reflecting layer 11 is, for example, a first hologram lens that has the transmission action and the light collecting-reflecting action with respect to the image light L0. It is to be noted that, for convenience of description, FIG. 2 simplifies the first light collecting-reflecting device and illustrates only the first substrate 10.

The second light collecting-reflecting device receives a second light beam L2 of the image light L0 having passed through the first light collecting-reflecting device, and has at least the light collecting-reflecting action with respect to the image light L0. The second light collecting-reflecting device causes the second light beam L2 to reenter the first light collecting-reflecting device, and collects and reflects the second light beam L2 toward a second conversion position P2.

The second conversion position P2 is a different position from the first conversion position P1 in a plane orthogonal to the optical axis of the viewer's eye. It is preferable that the first conversion position P1 be separated from the second conversion position P2 by spacing larger than a size of a pupil 201 of the viewer. In a case where the spacing between the first conversion position P1 and the second conversion position P2 is smaller than the size of the pupil 201, light of an identical pixel from the image forming apparatus 100 is simultaneously observed at different positions, which is not preferable.

Specifically, the second light collecting-reflecting device may be configured to have, for example, a second substrate 20 and a second semi-transmitting reflecting layer 21 formed on the second substrate 20. The second semi-transmitting reflecting layer 21 is, for example, a second hologram lens that has the transmission action and the light collecting-reflecting action with respect to the image light L0. It is to be noted, that for convenience of description, FIG. 2 simplifies the second light collecting-reflecting device and illustrates only the second substrate 20.

It is to be noted that the second light collecting-reflecting device may be configured not to have the transmission action. Configuring the second light collecting-reflecting device to have the transmission action allows light from outside to be captured. In a case where the image display apparatus is configured as a head-mounted display, for example, this makes it possible to view an image formed by the image forming apparatus 100, while being able to view the outside in a see-through manner.

1.2 Preferred Configuration Examples

In the following, description is given of a preferred configuration example relative to the basic configuration example of the aforementioned image display apparatus.

First Preferred Configuration Example

FIG. 3 schematically illustrates an example of an image display apparatus of a comparative example to the first embodiment. FIG. 4 schematically illustrates an example of a first preferred configuration example of the image display apparatus according to the first embodiment. It is to be noted that, for convenience of description, FIG. 3 and FIG. 4 simplify the first light collecting-reflecting device and the second light collecting-reflecting device and illustrate only the first substrate 10 and the second substrate 20. In FIG. 3 and FIG. 4, a value of brightness of the image light L0 entering the image display apparatus is 1. A value of brightness of light in another location is described as a relative value to the value of the brightness of the image light L0.

In the image display apparatus, as illustrated in FIG. 4, it is preferable that the first light collecting-reflecting device have a transmittance T1 with respect to the image light L0 that is higher than a reflectance R1 with respect to the image light L0, and the second light collecting-reflecting device have a reflectance R2 with respect to the image light L0 that is higher than the reflectance R1 of the first light collecting-reflecting device with respect to the image light L0.

That is, it is preferable that
T1>R1 and R2>R1 hold.

The comparative example of FIG. 3 illustrates an example where the transmittance T1 of the first light collecting-reflecting device with respect to the image light L0 is made equal to the reflectance R1 (T1=R1=0.5). In this case, it is not possible to equalize brightness of the eye (0.5 in the example of FIG. 3) resulting from the first light beam L1 collected and reflected by the first light collecting-reflecting device to the brightness of the eye (0.225 in the example of FIG. 3) resulting from the second light beam L2. The second light beam L2 has passed through the first light collecting-reflecting device after being collected and reflected by the second light collecting-reflecting device. Moreover, a ratio (0.5×0.1=0.05 in the example of FIG. 3) of the light passing through the second light collecting-reflecting device decreases, thus degrading see-through performance.

In contrast, as illustrated in FIG. 4, in a case where the transmittance T1 of the first light collecting-reflecting device with respect to the image light L0 is made higher than the reflectance R1 (T1=0.7 and R1=0.3 in the example of FIG. 4), it is possible to substantially equalize the brightness of the eye (0.3 in the example of FIG. 4) resulting from the first light beam L1 collected and reflected by the first light collecting-reflecting device to the brightness of the eye (0.299 in the example of FIG. 4) resulting from the second light beam L2. The second light beam L2 has passed through the first light collecting-reflecting device after being collected and reflected by the second light collecting-reflecting device. In addition, it is possible to increase the ratio (0.7×0.39=0.273 in the example of FIG. 4) of the light passing through the second light collecting-reflecting device, and thus the see-through performance is also superior.

Second Preferred Configuration Example

FIG. 5 and FIG. 6 schematically illustrate an example of a second preferred configuration example of the image display apparatus according to the first embodiment. It is to be noted that, for convenience of description, FIG. 6 simplifies the first light collecting-reflecting device and the second light collecting-reflecting device, and illustrates only the first substrate 10 and the second substrate 20.

It is preferable that a first light collecting distance (first back focus) with respect to the image light L0 between the first light collecting-reflecting device and the first conversion position P1 be shorter than a second light collecting distance (second back focus) with respect to the image light L0 between the second light collecting-reflecting device and the second conversion position P2. FIG. 6 illustrates an example where the first light collecting distance (first back focus) is 30 mm and the second light collecting distance (second back focus) is 32 mm. In a case where the aforementioned first light collecting distance is made equal to the second light collecting distance, a position of the first conversion position P1 differs from that of the second conversion position P2 in a Z-direction. This sometimes makes it difficult to cause all of the first light beam L1 from the first light collecting-reflecting device or the second light beam L2 from the second light collecting-reflecting device to enter the pupil 201. Consequently, to make the first conversion position P1 and the second conversion position P2 in the Z-direction appropriate, it is preferable that the aforementioned first light collecting distance and the aforementioned second light collecting distance differ by an appropriate value.

Third Preferred Configuration Example

FIG. 7 schematically illustrates an example of a third preferred configuration example of the image display apparatus according to the first embodiment. It is to be noted that, for convenience of description, FIG. 7 simplifies the first light collecting-reflecting device and the second light collecting-reflecting device and illustrates only the first substrate 10 and the second substrate 20.

In the image display apparatus, as illustrated in FIG. 7, it is preferable that a first projection region of the image light L0 from the image forming apparatus 100 projected onto the first light collecting-reflecting device be smaller than a second projection region of the image light L0 from the image forming apparatus 100 projected onto the second light collecting-reflecting device.

FIG. 7 illustrates, as the image light L0, the luminous flux La from the right pixel of the image forming apparatus 100, the luminous flux Lb from the left pixel of the image forming apparatus 100, and the luminous flux Lc from the middle pixel of the image forming apparatus 100. "The first projection region<the second projection region" is achieved by causing the luminous fluxes La, Lb, and Lc from the respective pixels to diverge and enter the image display apparatus, and not by causing the luminous fluxes La, Lb, and Lc to enter in parallel to each other. This allows an angle of view (30.1° in the example of FIG. 7) of the first light beam L1 from the first light collecting-reflecting device to match an angle of view (30.1° in the example of FIG. 7) of the second light beam L2 from the second light collecting-reflecting device. It is to be noted that, in the example of FIG. 6, the luminous fluxes La, Lb, and Lc from the respective pixels enter substantially parallel to each other, and thus, the angle of view (30.0°) of the first light beam L1 from the first light collecting-reflecting device differs from the angle of view (28.2°) of the second light beam L2 from the second light collecting-reflecting device.

1.3 Effects

As described above, according to the image display apparatus of the present embodiment, the first light beam L1 of the image light L0 is collected and reflected toward the first conversion position P1 by the first light collecting-reflecting device and the second light beam L2 of the image light L0 is collected and reflected toward the second conversion position P2 different from the first conversion position P1 by the second light collecting-reflecting device. Therefore, expansion of the viewable range of the image light L0 is possible.

With the image display apparatus according to the present embodiment, provision of a plurality of eye positions is possible with beams from an identical pixel of the image forming apparatus 100. Consequently, it is possible to make a natural view by matching directions of virtual images at the respective eye positions. In addition, in a case where the first light collecting-reflecting device is configured to include a hologram lens, it is possible to cause zero-order light to enter the second light collecting-reflecting device as transmitted light and re-use the zero-order light. Hence, it is possible to achieve low power consumption.

It is to be noted that the effects described herein are merely illustrative and non-limiting, and other effects may be further provided. This also applies to effects of other embodiments to be described later.

1.4 Modification Examples of First Embodiment

First Modification Example

FIG. 8 schematically illustrates a first modification example of the image display apparatus according to the first embodiment.

In the image display apparatus illustrated in FIG. 8, the first light collecting-reflecting device is configured to include a first half mirror 10A having the transmission action and the light collecting-reflecting action with respect to the image light L0. Further, the second light collecting-reflecting device is configured to include a second half mirror 20A having the transmission action and light collecting-reflecting action with respect to the image light L0.

Other configurations may be substantially similar to those of the image display apparatus according to the aforementioned basic configuration or the aforementioned preferred configuration examples.

Second Modification Example

FIG. 9 schematically illustrates a second modification example of the image display apparatus according to the first embodiment.

The image light L0 formed by an image forming apparatus other than the image forming apparatus 100 of the laser scanning type illustrated in FIG. 1 may enter the image display apparatus. FIG. 9 illustrates an example of an image forming apparatus including a display panel 110, a pin hole 111, and a light collecting lens 112. The display panel 110 is, for example, a liquid crystal display (LCD: Liquid Crystal Display) or an organic EL display (OELD: Organic Electro-Luminescence Display). The pin hole 111 and the light collecting lens 112 are provided to appropriately narrow a diameter of a beam of each pixel from the display panel 110.

Other configurations may be substantially similar to those of the image display apparatus according to the aforementioned basic configuration or the aforementioned preferred configuration examples.

Third Modification Example

FIG. 10 schematically illustrates a third modification example of the image display apparatus according to the first embodiment.

In a case where the beam of each pixel from the image forming apparatus 100 is made to diverge and enter the image display apparatus, the beam of each pixel is greatly projected onto side distant from the first light collecting-reflecting device and the second light collecting-reflecting device. Consequently, an overall shape of the image light L0 projected onto the first light collecting-reflecting device and the second light collecting-reflecting device is distorted into a trapezoidal shape, as illustrated in an upper left part of FIG. 10. As illustrated in a lower part of FIG. 10, a correction optical member 31 may be disposed between the image forming apparatus 100 and the first light collecting-reflecting device to correct the trapezoid-shaped distortion. The correction optical member 31 optically corrects the projection shape of the image light L0 by causing the image light L0 to diverge or converge, in accordance with the projection region. This corrects the overall shape of the image light L0 projected onto the first light collecting-reflecting device and the second light collecting-reflecting device into a rectangle shape, as illustrated in an upper right part of FIG. 10, for example.

In addition, instead of the optical correction by the correction optical member 31, the image forming apparatus 100 may be caused to electrically correct the image light L0. For example, the image light L0 may be corrected to electrically cause inverted trapezoid-shaped distortion in the image forming apparatus 100.

Other configurations may be substantially similar to those of the image display apparatus according to the aforementioned basic configuration or the aforementioned preferred configuration examples.

2. Second Embodiment

Next, description is given of an image display apparatus according to a second embodiment of the present disclosure. It is to be noted that, in the following, substantially the same parts as the components of the image display apparatus according to the aforementioned first embodiment are denoted by same reference numerals, and description thereof is omitted where appropriate.

FIG. 11 schematically illustrates an example of the image display apparatus according to the second embodiment of the present disclosure. FIG. 12 schematically illustrates an example of an image display apparatus of a comparative example to the second embodiment. It is to be noted that, for convenience of description, FIG. 11 and FIG. 12 simplify the first light collecting-reflecting device and the second light collecting-reflecting device and illustrate only the first substrate 10 and the second substrate 20. In addition, in FIG. 11 and FIG. 12, Pwa represents a beam waist position of the luminous flux La from the right pixel, Pwb represents a beam waist position of the luminous flux Lb from the left pixel, and Pwc represents a beam waist position of the luminous flux Lc from the middle pixel.

The image display apparatus illustrated in FIG. 11 is configured to further include a prism-shaped optical path length correcting member 30, relative to the configuration example of FIG. 1, etc. The optical path length correcting member 30 is disposed on an optical path between the first light collecting-reflecting device and the image forming apparatus 100 and has a non-uniform thickness. As for the thickness of the optical path length correcting member 30, of light beams outputted from the image forming apparatus 100 and reaching the first light collecting-reflecting device, a thickness of a region through which a light beam with a short-length optical path between the image forming apparatus 100 and the first light collecting-reflecting device passes is formed smaller than a thickness of a region through which a light beam with a long-length optical path between the image forming apparatus 100 and the first light collecting-reflecting device passes.

In the comparative example of FIG. 12, the luminous flux La from the right pixel is a divergent beam with respect to the eye, the luminous flux Lb from the left pixel is a convergent beam with respect to the eye, and the luminous flux Lc from the middle pixel is a parallel beam with respect to the eye. In this case, an image formation state on a retina differs in accordance with the pixel. Therefore, in the configuration example of FIG. 11, the optical path length correcting member 30 corrects a divergent angle or a convergent angle of the beam of each of the pixels to the eye, and corrects the beam of each of the pixels to cause it to be closer to the parallel beam with respect to the eye. A region more distant to the image forming apparatus 100 has a longer distance between the first light collecting-reflecting device or the second light collecting-reflecting device and the beam waist. Consequently, in the configuration example of FIG. 11, the optical path length correcting member 30 having the non-uniform thickness makes more moderate a difference in the optical path length of the beam of each of the pixels to the eye.

Other configurations may be substantially similar to those of the image display apparatus according to the aforementioned first embodiment.

2.2 Modification Example of Second Embodiment

FIG. 13 schematically illustrates a modification example of the image display apparatus according to the second embodiment.

Relative to the configuration example of FIG. 11, in the modification example illustrated in FIG. 13, the first light collecting-reflecting device is configured to include a first half mirror 10A having the transmission action and the light collecting-reflecting action with respect to the image light L0. In addition, the second light collecting-reflecting device is configured to include a second half mirror 20A having the transmission action and the light collecting-reflecting action with respect to the image light L0.

In the modification example illustrated in FIG. 13, similarly to the configuration example of FIG. 11, the optical path length correcting member 30 with the non-uniform thickness is also disposed, thus making more moderate the difference in the optical path length of the beam of each of the pixels with respect to the eye. This corrects the beam of each of the pixels with respect to the eye to be closer to the parallel beam.

3. Third Embodiment

Next, description is given of an image display apparatus according to a third embodiment of the present disclosure. It is to be noted that, in the following, substantially the same parts as the components of the image display apparatuses according to the aforementioned first embodiment or the aforementioned second embodiment are denoted by the same reference numerals, and description thereof is omitted where appropriate.

FIG. 14 schematically illustrates an example of the image display apparatus according to the third embodiment of the present disclosure. It is to be noted that, for convenience of description, FIG. 14 simplifies the first light collecting-reflecting device and the second light collecting-reflecting device and illustrates only the first substrate 10 and the second substrate 20. In addition, in FIG. 14, Pwa represents the beam waist position of the luminous flux La from the right pixel, Pwb represents the beam waist position of the luminous flux Lb from the left pixel, and Pwc represents the beam waist position of the luminous flux Lc from the middle pixel.

Relative to the configuration example of FIG. 11, for example, the image display apparatus illustrated in FIG. 14 has a configuration in which a first focal length resulting from the light collecting-reflecting action of the first light collecting-reflecting device and a second focal length resulting from the light collecting-reflecting action of the second light collecting-reflecting device vary in accordance with a position. The first focal length resulting from the light collecting-reflecting action of the first light collecting-reflecting device is shorter as the distance between the first light collecting-reflecting device and the image forming apparatus 100 is closer. Similarly, the second focal length resulting from the light collecting-reflecting action of the second light collecting-reflecting device is shorter as the distance between the second light collecting-reflecting device and the image forming apparatus 100 is closer.

FIG. 15 schematically illustrates an example of a focal position provided by the first light collecting-reflecting device in the image display apparatus according to the third embodiment. In FIG. 15, "fa1" represents a focal position of the luminous flux La from the right pixel collected by the first light collecting-reflecting device, "fb1" represents a focal position of the luminous flux Lb from the left pixel collected by the first light collecting-reflecting device, and "fc1" represents a focal position of the luminous flux Lc from the middle pixel collected by the first light collecting-reflecting device.

FIG. 16 schematically illustrates an example of a focal position provided by the second light collecting-reflecting device in the image display apparatus according to the third embodiment. In FIG. 16, "fa2" represents a focal position of the luminous flux La from the right pixel collected by the second light collecting-reflecting device, "fb2" represents a focal position of the luminous flux Lb from the left pixel collected by the second light collecting-reflecting device, and "fc2" represents a focal position of the luminous flux Lc from the middle pixel collected by the second light collecting-reflecting device.

As described above, in the comparative example of FIG. 12, the luminous flux La from the right pixel is the divergent beam with respect to the eye, the luminous flux Lb from the left pixel is the convergent beam with respect to the eye, and the luminous flux Lc from the middle pixel is the parallel beam with respect to the eye. In this case, the image formation state on the retina differs between the pixels. As described above, to adjust the divergent angle or the convergent angle of the beam of each of the pixels to the eye, the present embodiment has a configuration in which the first focal length resulting from the light collecting-reflecting action of the first light collecting-reflecting device and the second focal length resulting from the light collecting-reflecting action of the second light collecting-reflecting device vary in accordance with the position. A region closer to the image forming apparatus 100 has a shorter distance between the first light collecting-reflecting device or the second light collecting-reflecting device and the beam waist. Consequently, in the present embodiment, the region closer to the image forming apparatus 100 has the shorter focal length of the first light collecting-reflecting device and the second light collecting-reflecting device to cause the beam of each of the pixels to be in a state close to the parallel beam, after reflecting the beam of each of the pixels by the first light collecting-reflecting device or the second light collecting-reflecting device.

Other configurations may be substantially similar to those of the image display apparatus according to the aforementioned first embodiment or the second embodiment.

3.2 Modification Example of Third Embodiment

FIG. 17 schematically illustrates a modification example of the image display apparatus according to the third embodiment.

In the modification example illustrated in FIG. 17, relative to the configuration example of FIG. 16, the first light collecting-reflecting device is configured to include the first half mirror 10A having the transmission action and the light collecting-reflecting action with respect to the image light L0. Further, the second light collecting-reflecting device is configured to include the second half mirror 20A having the transmission action and the light collecting-reflecting action with respect to the image light L0. In addition, relative to the configuration example of FIG. 16, the modification example illustrated in FIG. 17 has the configuration in which the optical path length correcting member 30 is omitted.

Also in the modification example illustrated in FIG. 17, similarly to the configuration example of FIG. 16, the region closer to the image forming apparatus 100 has the shorter focal length of each of the first half mirror 10A and the second half mirror 20A to cause the beam of each of the pixels to be in the state close to the parallel beam, after reflecting the beam of each of the pixels by the first half mirror 10A or the second half mirror 20A.

4. Fourth Embodiment

Next, description is given of an image display apparatus according to a fourth embodiment of the present disclosure. It is to be noted that, in the following, substantially the same parts as the components of the image display apparatus according to any of the aforementioned first to third embodiments are denoted by the same reference numerals, and description thereof is omitted where appropriate.

First Configuration Example

FIG. 18 schematically illustrates a first configuration example of the image display apparatus according to the fourth embodiment of the present disclosure. It is to be noted that, for convenience of description, FIG. 18 simplifies the first light collecting-reflecting device and the second light collecting-reflecting device and illustrates only the first substrate 10 and the second substrate 20.

Relative to the configuration example of FIG. 11, for example, the image display apparatus illustrated in FIG. 18 is configured to further include a drive mechanism 40, a drive controller 41, and an illuminometer 42.

The drive mechanism 40 is a mechanism that translates the first light collecting-reflecting device, the second light collecting-reflecting device, or both in a direction of entry of the image light L0 from the image forming apparatus 100. The drive controller 41 controls an amount of translation of the first light collecting-reflecting device, the second light collecting-reflecting device, or both by the drive mechanism 40, on the basis of a state of the viewer's eye.

Here, the state of the viewer's eye is a pupil size, for example. The pupil size varies in accordance with brightness of a surrounding environment. The drive controller 41 determines the pupil size on the basis of the brightness of the surrounding environment measured by the illuminometer 42. The varying pupil size may simultaneously position the first conversion position P1 of the first light beam L1 of the first light collecting-reflecting device and the second conversion position P2 of the second light beam L2 of the second light collecting-reflecting device in the pupil. To prevent this, the first light collecting-reflecting device, the second light collecting-reflecting device, or both is translated in the direction of entry of the image light L0 from the image forming apparatus 100. In a case where the drive controller 41 determines that the surrounding environment is bright, for example, the drive controller 41 controls the amount of translation to cause the second conversion position P2 to shift to a direction away from the first conversion position P1. As illustrated in FIG. 18, for example, the second conversion position P2 shifts in the direction away from the first conversion position P1, by translation of the second light collecting-reflecting device in the direction of entry of the image light L0 to cause the second light collecting-reflecting device to move away from the first light collecting-reflecting device.

Second Configuration Example

FIG. 19 schematically illustrates a second configuration example of the image display apparatus according to the fourth embodiment of the present disclosure. It is to be noted that, for convenience of description, FIG. 19 simplifies the first light collecting-reflecting device and the second light collecting-reflecting device and illustrates only the first substrate 10 and the second substrate 20.

Similarly to the configuration example of FIG. 18, the image display apparatus illustrated in FIG. 19 is configured to further include the drive mechanism 40, the drive controller 41, and an eye position detector 43, relative to the configuration example of FIG. 11.

In the configuration example illustrated in FIG. 19, the drive mechanism 40 is a mechanism that inclines (rotates) and moves the first light collecting-reflecting device, the second light collecting-reflecting device, or both. The drive controller 41 controls an amount of inclination of the first light collecting-reflecting device, the second light collecting-reflecting device, or both by the drive mechanism 40, on the basis of the state of the viewer's eye.

Here, similarly to the configuration example of FIG. 18, the state of the viewer's eye is the pupil size, for example. The drive controller 41 determines the pupil size and controls the amount of inclination on the basis of the brightness of the surrounding environment measured by the illuminometer 42. For example, in a case where the drive controller 41 determines that the surrounding environment is bright, the drive controller 41 controls the amount of inclination to cause the first conversion position P1 to shift in a direction away from the second conversion position P2. As illustrated in FIG. 19, for example, the first conversion position P1 shifts to the direction away from the second conversion position P2 by anticlockwise inclination (rotation) movement of the first light collecting-reflecting device.

It is to be noted that, although the configuration example of translation and the configuration example of inclination movement are separately described above, both of the configuration examples may also be combined to perform both of the translation and the inclination movement.

Other configurations may be substantially similar to those of the image display apparatus of any of the aforementioned first to third embodiments.

5. Fifth Embodiment

Next, description is given of an image display apparatus according to a fifth embodiment of the present disclosure. It is to be noted that, in the following, substantially the same parts as the components of the image display apparatus according to any of the aforementioned first to fourth embodiments are denoted by the same reference numerals, and description thereof is omitted where appropriate.

FIG. 20 schematically illustrates an example of the image display apparatus according to the fifth embodiment of the present disclosure. It is to be noted that, for convenience of description, FIG. 20 simplifies the first light collecting-reflecting device and the second light collecting-reflecting device and illustrates only the first substrate 10 and the second substrate 20.

Relative to the configuration example of FIG. 6, for example, the image display apparatus illustrated in FIG. 20 is configured to further include the drive mechanism 40, the drive controller 41, and the eye position detector 43.

In the present embodiment, the drive mechanism 40 is a mechanism that translates both of the first light collecting-reflecting device and the second light collecting-reflecting device with respect to the image forming apparatus 100. The drive controller 41 controls an amount of translation of both of the first light collecting-reflecting device and the second light collecting-reflecting device by the drive mechanism 40, on the basis of a position of the viewer's eye.

Although, in the image display apparatuses according to the aforementioned first to fourth embodiments, description is given of a case where the eyeball 200 is fixed, the eyeball 200 may possibly move. In a case where the eyeball 200 moves, the first conversion position P1 of the first light beam L1 of the first light collecting-reflecting device and the second conversion position P2 of the second light beam L2 of the second light collecting-reflecting device may be out of the pupil 201. Accordingly, in the present embodiment, the drive controller 41 determines the position of the viewer's eye by means of the eye position detector 43, and controls the amount of translation of both of the first light collecting-reflecting device and the second light collecting-reflecting device on the basis of the position of the viewer's eye, thereby translating the first conversion position P1 and the second conversion position P2. That is, the drive controller 41 translates the first conversion position P1 and the second conversion position P2, following the movement of the eyeball 200. Translation of both of the first light collecting-reflecting device and the second light collecting-reflecting device with respect to the image forming apparatus 100 allows for translation of both of the first conversion position P1 and the second conversion position P2 in an identical direction.

Modification Example

FIG. 21 schematically illustrates a modification example of the image display apparatus according to the fifth embodiment.

The modification example of FIG. 21 illustrates a configuration example in which the image light L0 from the image forming apparatus 100 is caused to enter the first light collecting-reflecting device via the optical path length correcting member 30 and a light guide plate 50. The light guide plate 50 is disposed in parallel to the first light collecting-reflecting device and the second light collecting-reflecting device. Also in such a configuration, similarly to the configuration example of FIG. 20, it is possible to translate both of the first light collecting-reflecting device and the second light collecting-reflecting device to follow the movement of the eyeball 200. In this case, it is preferable that the drive mechanism 40 move both of the first light collecting-reflecting device and the second light collecting-reflecting device in a direction parallel to the light guide plate 50.

Other configurations may be substantially similar to those of the image display apparatus of any of the aforementioned first to fourth embodiments.

6. Sixth Embodiment

Next, description is given of an image display apparatus according to a sixth embodiment of the present disclosure. It is to be noted that, in the following, substantially the same parts as the components of the image display apparatus according to any of the aforementioned first to fifth embodiments are denoted by the same reference numerals, and description thereof is omitted where appropriate.

FIG. 22 schematically illustrates an example of the image display apparatus according to the sixth embodiment of the present disclosure. FIG. 23 schematically illustrates an example of an image display apparatus of a comparative example with respect to the sixth embodiment.

Although, in the image display apparatuses according to the aforementioned first to fifth embodiments, description has been given of a case where the first light collecting-reflecting device and the second light collecting-reflecting device are configured to include the hologram lens or the half mirror, the first light collecting-reflecting device and the second light collecting-reflecting device may also be configured to include a diffraction grating.

In the image display apparatus illustrated in FIG. 22, the first light collecting-reflecting device is configured to include a first diffraction grating 10B having the transmission action and the light collecting-reflecting action with respect to the image light L0. Further, the second light collecting-reflecting device is configured to include a second diffraction grating 20B having the transmission action and the light collecting-reflecting action with respect to the image light L0.

In such a configuration that uses the diffraction grating, an entry angle θ1 of the image light L0 that enters the first diffraction grating 10B is preferably larger than a reentry angle θ2 of the second light beam L2 that reenters the first diffraction grating 10B from the second diffraction grating 20B. It is to be noted that the entry angle θ1 is the same angle, irrespective of a position of the first diffraction grating 10B. The reentry angle θ2 is a different angle depending on a position, because the second diffraction grating 20B has a light collecting characteristic.

Here, the comparative example of FIG. 23 illustrates a case where the entry angle θ1 of the image light L0 that enters the first diffraction grating 10B is smaller than the reentry angle θ2.

In the case of the configuration example of FIG. 22, when the second light beam L2 from the second diffraction grating 20B reenters the first diffraction grating 10B, a reflection angle at the second diffraction grating 20B is maintained as it is without being influenced by the first diffraction grating 10B. Consequently, the second light beam L2 converges to the substantially-identical second conversion position P2, irrespective of the position of the second diffraction grating 20B. In contrast, in the comparative example of FIG. 23, when the second light beam L2 from the second diffraction grating 20B reenters the first diffraction grating 10B, influenced by the first diffraction grating 10B, the reflection angle at the second diffraction grating 20B is not maintained, and the second light beam L2 is outputted from the first diffraction grating 10B at an angle that varies in accordance with the position. Consequently, the second light beam L2 converges to a different position in accordance with the position of the second diffraction grating 20B. Therefore, an image that should be normally viewed at the second conversion position P2 is viewed at the first conversion position P1. Moreover, a portion of the image that should be normally viewed at the second conversion position P2 is missing.

Other configurations may be substantially similar to those of the image display apparatus of any of the aforementioned first to fifth embodiments.

7. Other Embodiments

The technology according to the present disclosure is not limited to the aforementioned description of the respective embodiments, and may be modified and carried out in various ways.

For example, in the aforementioned respective embodiments, although description has been given of the configuration examples that include the two light collecting-reflecting devices, the configurations may include three or more light collecting-reflecting devices.

Moreover, the present technology may have the following configurations, for example.

(1)

An image display apparatus including:

a first light collecting-reflecting device which image light from an image forming apparatus enters, the first light collecting-reflecting device having transmission action and light collecting-reflecting action with respect to the image light, the first light collecting-reflecting device collecting and reflecting first light, of the entering image light, toward a first conversion position in a viewer's eye; and a second light collecting-reflecting device which second light, of the image light, having passed through the first light collecting-reflecting device enters, the second light collecting-reflecting device having at least the light collecting-reflecting action with respect to the image light, the second light collecting-reflecting device causing the second light to reenter the first light collecting-reflecting device and collecting and reflecting the second light toward a second conversion position, the second conversion position being different from the first conversion position in a plane orthogonal to an optical axis of the viewer's eye.

(2)

The image display apparatus according to (1) described above, in which the first light collecting-reflecting device has a transmittance with respect to the image light higher than a reflectance with respect to the image light, and the second light collecting-reflecting device has a reflectance with respect to the image light higher than the reflectance, with respect to the image light, of the first light collecting-reflecting device.

(3)

The image display apparatus according to (1) or (2) described above, in which a first light collecting distance with respect to the image light between the first light collecting-reflecting device and the first conversion position is shorter than a second light collecting distance with respect to the image light between the second light collecting-reflecting device and the second conversion position.

(4)

The image display apparatus according to any one of (1) to (3) described above, in which a first projection region of the image light projected from the image forming apparatus onto the first light collecting-reflecting device is smaller than a second projection region of the image light projected from the image forming apparatus onto the second light collecting-reflecting device.

(5)

The image display apparatus according to any one of (1) to (4) described above, further including an optical path length correcting member disposed on an optical path between the first light collecting-reflecting device and the image forming apparatus and having a non-uniform thickness, the thickness being provided to include a thickness, of a region through which a light beam with a short-length optical path between the image forming apparatus and the first light collecting-reflecting device passes, that is smaller than a thickness of a region through which a light beam with a long-length optical path between the image forming apparatus and the first light collecting-reflecting device passes, the light beam with the short-length optical path and the light beam with the long-length optical path being included in light beams that exit from the image forming apparatus and reach the first light collecting-reflecting device.

(6)

The image display apparatus according to any one of (1) to (5) described above, in which a first focal length resulting from the light collecting-reflecting action of the first light collecting-reflecting device is shorter as a distance between the first light collecting-reflecting device and the image forming apparatus is closer, and a second focal length resulting from the light collecting-reflecting action of the second light collecting-reflecting device is shorter as a distance between the second light collecting-reflecting device and the image forming apparatus is closer.

(7)

The image display apparatus according to any one of (1) to (6) described above, further including:

a drive mechanism that translates the first light collecting-reflecting device, the second light collecting-reflecting device, or both in a direction of entry of the image light from the image forming apparatus; and a drive controller that controls an amount of translation, by the drive mechanism, of the first light collecting-reflecting device, the second light collecting-reflecting device, or both, on the basis of a state of the viewer's eye.

(8)

The image display apparatus according to any one of (1) to (7) described above, further including:

a drive mechanism that inclines the first light collecting-reflecting device, the second light collecting-reflecting device, or both; and a drive controller that controls an amount of inclination, by the drive mechanism, of the first light collecting-reflecting device, the second light collecting-reflecting device, or both, on the basis of a state of the viewer's eye.

(9)

The image display apparatus according to any one of (1) to (8) described above, further including:

a drive mechanism that translates both of the first light collecting-reflecting device and the second light collecting-reflecting device with respect to the image forming apparatus; and a drive controller that controls amounts of translation, by the drive mechanism, of both of the first light collecting-reflecting device and the second light collecting-reflecting device, on the basis a position of the viewer's eye.

(10)

The image display apparatus according to any one of (1) to (9) described above, in which the first light collecting-reflecting device includes a diffraction grating, and an entry angle of the image light that enters the diffraction grating is larger than an entry angle of the second light, from the second light collecting-reflecting device, that enters the diffraction grating.

(11)

The image display apparatus according to any one of (1) to (9) described above, in which the first light collecting-reflecting device includes a first hologram lens having the transmission action and the light collecting-reflecting action with respect to the image light, and the second light collecting-reflecting device includes a second hologram lens having the transmission action and the light collecting-reflecting action with respect to the image light.

(12)

The image display apparatus according to any one of (1) to (9) described above, in which the first light collecting-reflecting device includes a first half mirror having the transmission action and the light collecting-reflecting action with respect to the image light, and the second light collecting-reflecting device includes a second half mirror having the transmission action and the light collecting-reflecting action with respect to the image light.

(13)

The image display apparatus according to any one of (1) to (12) described above, in which the first conversion position and the second conversion position are separated by spacing larger than a size of a pupil of the viewer.

The present application is based on and claims priority from Japanese Patent Application No. 2017-079777 filed with the Japan Patent Office on Apr. 13, 2017, the entire contents of which is hereby incorporated by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. An image display apparatus comprising:
a first light collecting-reflecting device which image light from an image forming apparatus enters, the first light collecting-reflecting device having transmission action and light collecting-reflecting action with respect to the image light, the first light collecting-reflecting device collecting and reflecting first light, of the entering image light, toward a first conversion position in a viewer's eye; and
a second light collecting-reflecting device which second light, of the image light, having passed through the first light collecting-reflecting device enters, the second light collecting-reflecting device having at least the light collecting-reflecting action with respect to the image light, the second light collecting-reflecting device causing the second light to reenter the first light collecting-reflecting device and collecting and reflecting the second light toward a second conversion position, the second conversion position being different from the first conversion position in a plane orthogonal to an optical axis of the viewer's eye.

2. The image display apparatus according to claim 1, wherein
the first light collecting-reflecting device has a transmittance with respect to the image light higher than a reflectance with respect to the image light, and
the second light collecting-reflecting device has a reflectance with respect to the image light higher than the reflectance, with respect to the image light, of the first light collecting-reflecting device.

3. The image display apparatus according to claim 1, wherein a first light collecting distance with respect to the image light between the first light collecting-reflecting device and the first conversion position is shorter than a second light collecting distance with respect to the image light between the second light collecting-reflecting device and the second conversion position.

4. The image display apparatus according to claim 1, wherein a first projection region of the image light projected from the image forming apparatus onto the first light collecting-reflecting device is smaller than a second projection region of the image light projected from the image forming apparatus onto the second light collecting-reflecting device.

5. The image display apparatus according to claim 1, further comprising an optical path length correcting member disposed on an optical path between the first light collecting-reflecting device and the image forming apparatus and having a non-uniform thickness, the thickness being provided to include a thickness, of a region through which a light beam with a short-length optical path between the image forming apparatus and the first light collecting-reflecting device passes, that is smaller than a thickness of a region through which a light beam with a long-length optical path between the image forming apparatus and the first light collecting-reflecting device passes, the light beam with the short-length optical path and the light beam with the long-length optical path being included in light beams that exit from the image forming apparatus and reach the first light collecting-reflecting device.

6. The image display apparatus according to claim 1, wherein
a first focal length resulting from the light collecting-reflecting action of the first light collecting-reflecting device is shorter as a distance between the first light collecting-reflecting device and the image forming apparatus is closer, and
a second focal length resulting from the light collecting-reflecting action of the second light collecting-reflecting device is shorter as a distance between the second light collecting-reflecting device and the image forming apparatus is closer.

7. The image display apparatus according to claim 1, further comprising:
a drive mechanism that translates the first light collecting-reflecting device, the second light collecting-reflecting device, or both in a direction of entry of the image light from the image forming apparatus; and
a drive controller that controls an amount of translation, by the drive mechanism, of the first light collecting-reflecting device, the second light collecting-reflecting device, or both, on a basis of a state of the viewer's eye.

8. The image display apparatus according to claim 1, further comprising:

a drive mechanism that inclines the first light collecting-reflecting device, the second light collecting-reflecting device, or both; and
a drive controller that controls an amount of inclination, by the drive mechanism, of the first light collecting-reflecting device, the second light collecting-reflecting device, or both, on a basis of a state of the viewer's eye.

9. The image display apparatus according to claim 1, further comprising:
a drive mechanism that translates both of the first light collecting-reflecting device and the second light collecting-reflecting device with respect to the image forming apparatus; and
a drive controller that controls amounts of translation, by the drive mechanism, of both of the first light collecting-reflecting device and the second light collecting-reflecting device, on a basis a position of the viewer's eye.

10. The image display apparatus according to claim 1, wherein
the first light collecting-reflecting device includes a diffraction grating, and
an entry angle of the image light that enters the diffraction grating is larger than an entry angle of the second light, from the second light collecting-reflecting device, that enters the diffraction grating.

11. The image display apparatus according to claim 1, wherein
the first light collecting-reflecting device includes a first hologram lens having the transmission action and the light collecting-reflecting action with respect to the image light, and
the second light collecting-reflecting device includes a second hologram lens having the transmission action and the light collecting-reflecting action with respect to the image light.

12. The image display apparatus according to claim 1, wherein
the first light collecting-reflecting device includes a first half mirror having the transmission action and the light collecting-reflecting action with respect to the image light, and
the second light collecting-reflecting device includes a second half mirror having the transmission action and the light collecting-reflecting action with respect to the image light.

13. The image display apparatus according to claim 1, wherein the first conversion position and the second conversion position are separated by spacing larger than a size of a pupil of the viewer.

* * * * *